US008781327B2

(12) United States Patent
Shen et al.

(10) Patent No.: US 8,781,327 B2
(45) Date of Patent: Jul. 15, 2014

(54) USE OF MULTIPLE SHARED WAVELENGTH LOCKERS TO STABILIZE TRANSPONDERS IN A WAVELENGTH DIVISION MULTIPLEXING (WDM) NETWORK

(75) Inventors: Xiao A. Shen, San Bruno, CA (US); Hongbing Lei, Sunnyvale, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 321 days.

(21) Appl. No.: 13/177,771

(22) Filed: Jul. 7, 2011

(65) Prior Publication Data

US 2012/0008955 A1    Jan. 12, 2012

Related U.S. Application Data

(60) Provisional application No. 61/362,792, filed on Jul. 9, 2010.

(51) Int. Cl.
*H04J 14/02* (2006.01)
*H04B 10/04* (2006.01)
*H04B 10/24* (2006.01)

(52) U.S. Cl.
USPC ............ 398/79; 398/196; 398/195; 398/192; 398/41; 398/42; 398/43

(58) Field of Classification Search
USPC ................... 398/41–43, 79, 196, 195, 192
See application file for complete search history.

(56) References Cited

U.S. PATENT DOCUMENTS 5,825,792 A    10/1998  Villeneuve et al.
6,118,562 A *   9/2000  Lee et al. ......................... 398/1
6,233,261 B1 *  5/2001  Mesh et al. ............... 372/29.012
6,240,109 B1 *  5/2001  Shieh ............................. 372/18
6,556,328 B1 *  4/2003  Tanaka ........................... 398/192

(Continued)

FOREIGN PATENT DOCUMENTS

CN    101057425 A    10/2007
CN    101674135 A     3/2010
CN    101729184 A     6/2010
EP      1855396 A1    11/2007

OTHER PUBLICATIONS

ITU-T, "Series G: Transmission Systems and Media, Digital Systems and Networks, Digital Sections and Digital Line System-Optical line Systems for Local and Access Networks, Gigabit-Capable Passive optical Networks (GPON): General Characteristics," G.984.1, Mar. 2008, 43 pages.

(Continued)

*Primary Examiner* — Oommen Jacob
(74) *Attorney, Agent, or Firm* — Conley Rose, P.C.; Grant Rodolph; Jonathan K. Polk

(57) ABSTRACT

An apparatus comprising at least one processor configured to receive a wavelength-division-multiplexed (WDM) signal from a remote node, wherein the WDM signal comprises a first channel carrying a first remotely generated signal, a second channel carrying a second remotely generated signal, and a third channel, adapt the WDM signal into a composite WDM signal by: dropping the first remotely generated signal from the first channel; adding a first locally generated signal to the first channel; and adding a second locally generated signal to the third channel, and provide wavelength locking to the first locally generated signal and the second locally generated signal without providing wavelength locking to the second remotely generated signal.

19 Claims, 9 Drawing Sheets

(56) References Cited

U.S. PATENT DOCUMENTS

| | | | |
|---|---|---|---|
| 6,647,209 B1* | 11/2003 | Boord et al. | 398/84 |
| 6,862,303 B2* | 3/2005 | Kim et al. | 372/32 |
| 8,218,964 B2* | 7/2012 | Tanzi et al. | 398/1 |
| 2002/0048063 A1* | 4/2002 | Jung et al. | 359/124 |
| 2002/0186434 A1* | 12/2002 | Roorda et al. | 359/128 |
| 2003/0007209 A1* | 1/2003 | Liu et al. | 359/127 |
| 2004/0109685 A1* | 6/2004 | Wan et al. | 398/41 |
| 2006/0045532 A1* | 3/2006 | Yano | 398/147 |
| 2007/0172240 A1* | 7/2007 | Terai et al. | 398/83 |
| 2007/0280700 A1* | 12/2007 | Remedios et al. | 398/183 |
| 2008/0080865 A1* | 4/2008 | Muro et al. | 398/83 |
| 2008/0089692 A1 | 4/2008 | Sorin et al. | |
| 2009/0074418 A1* | 3/2009 | Levy et al. | 398/83 |
| 2009/0148166 A1* | 6/2009 | Akiyama et al. | 398/83 |
| 2009/0196612 A1 | 8/2009 | Lee et al. | |
| 2009/0232493 A1* | 9/2009 | Tu | 398/17 |
| 2010/0284687 A1* | 11/2010 | Tanzi et al. | 398/1 |
| 2011/0085794 A1 | 4/2011 | Lei et al. | |
| 2011/0158651 A1 | 6/2011 | Tang et al. | |
| 2011/0200334 A1 | 8/2011 | Wu et al. | |

OTHER PUBLICATIONS

ITU-T, "Series G: Transmission Systems and Media, Digital Systems and Networks, Digital Sections and Digital Line System-Optical line Systems for Local and Access Networks, Gigabit-Capable Passive Optical networks (GPON): Physical Media Dependent (PMD) Layer Specification," G. 984.2, Mar. 2003, 38 pages.

Hyunjae Lee, G. Y. Lyu, S. Y. Park, and J. H. Lee, "Multichannel Wavelength Locking Using Transmission Peaks of an AWG for Multichannel Optical Transmission Systems," IEEE Photon. Technology Letters, vol. 10, pp. 276-278, 1998.

Foreign Communication From a Counterpart Application, PCT Application PCT/CN2011/077020, International Search Report, dated Oct. 20, 2011, 3 pages.

* cited by examiner

USE OF MULTIPLE SHARED WAVELENGTH LOCKERS TO STABILIZE TRANSPONDERS IN A WAVELENGTH DIVISION MULTIPLEXING (WDM) NETWORK

CROSS-REFERENCE TO RELATED APPLICATIONS

The present application claims priority to U.S. Provisional Patent Application No. 61/362,792, filed Jul. 9, 2010 by Xiao Shen et al., and entitled "Use of Multiple Shared Wavelength Lockers to Stabilize a Large Number of Transponders in a Dense Wavelength Division Multiplexing (DWDM) Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional wavelength division multiplexing (WDM) transmitter arrays may employ semiconductor lasers as optical transmitters. The performance of WDM systems depends on the signal integrity from the laser sources, which may fluctuate due to variations in the environment (e.g., temperature, etc.) and/or conditions of the laser (e.g., age, quality control in the manufacturing process). A general dichotomy exists between Coarse WDM (CWDM) networks and Dense WDM (DWDM) networks, in that CWDM networks may comprise a relatively wide channel spacing (e.g., about 20 nanometers (nm) or about 2500 Gigahertz (GHz), while dense WDM (DWDM) networks may comprise a relatively narrow channel spacing (e.g., about 0.8 nm or about 100 GHz). Accordingly, CWDM networks may comprise substantially fewer channels (e.g., up to about 18 channels) than DWDM networks (e.g., up to about 128 channels). Typical CWDM networks and DWDM networks may be described in International Telecommunications Union (ITU) Standardization Section (ITU-T) publication G.984.2 and ITU-T G984.1 (respectively), both of which are incorporated herein by reference as if reproduced in their entirety.

Due to their respective channel spacing, signal integrity may be more critical in DWDM networks than in CWDM networks. For instance, while a relatively small fluctuation/variation in signal integrity (e.g., wavelength drift) may be acceptable in CWDM networks, an equivalent variation may substantially reduce service quality in DWDM networks. Consequently, many CWDM systems may implement some strategy for correcting wavelength float. One strategy for correcting wavelength float is to provide wavelength locking via a feedback system that compares the actual laser output wavelength to the target laser output wavelength. Such feedback systems may employ a wavelength locker ($\lambda$-locker) to detect a difference between output and target wavelengths (e.g., a wavelength deviation), and an element manager to adjust the laser output accordingly. Specifically the $\lambda$-locker may detect the wavelength deviation by comparing a reference signal to a signal transmitted through an etalon to determine a signal differential, e.g., a difference in phase, amplitude, frequency, or combinations thereof, which may correspond to the output signal's deviation from the target wavelength. As such, the $\lambda$-locker may use the signal intensity differential to determine the wavelength deviation, which may be communicated to the element manager so that the laser's output can be adjusted accordingly. Wavelength locking techniques may be described in greater detail in U.S. patent application Ser. No. 12/579,196 filed on Oct. 14, 2009 by Hongbing Lei et al., and entitled "Wavelength Locker for Simultaneous Control of Multiple Dense Wavelength Division Multiplexing Transmitters", which is incorporated by reference herein as if reproduced in its entirety.

Conventional distributed wavelength locking schemes may employ one dedicated $\lambda$-locker for each downstream channel (i.e., one $\lambda$-locker per transmitter), thereby using a separate $\lambda$-locker to provide wavelength locking to each respective laser source. Specifically, a dedicated wavelength locker may be located between each of the optical transmitters and the optical multiplexer and may be configured to detect wavelength float in each optical transmitter's output signal before the plurality of output signals are multiplexed into a WDM signal. However, $\lambda$-lockers may be relatively expensive such that networks employing more $\lambda$-lockers (e.g., dedicated $\lambda$-lockers, or one $\lambda$-locker per channel) may be substantially more expensive that those that employ fewer wavelength lockers (e.g., one $\lambda$-locker for multiple channels). For instance, conventional centralized wavelength locking schemes may employ a centralized $\lambda$-locker (e.g., a single $\lambda$-locker for all channels), and hence may be a cost effective alternative to conventional distributed networks. Specifically, the centralized $\lambda$-locker may be located downstream from the optical multiplexer, and may be configured to detect wavelength float in a plurality of channels in the WDM signal.

SUMMARY

Disclosed herein is an apparatus comprising at least one processor configured to receive a WDM signal from a remote node, wherein the WDM signal comprises a first channel carrying a first remotely generated signal, a second channel carrying a second remotely generated signal, and a third channel, adapt the WDM signal into a composite WDM signal by dropping the first remotely generated signal from the first channel, adding a first locally generated signal to the first channel; and adding a second locally generated signal to the third channel, and provide wavelength locking to the first locally generated signal and the second locally generated signal without providing wavelength locking to the second remotely generated signal.

Also disclosed herein is an apparatus comprising a first transponder configured to generate a first optical signal, a second transponder configured to generate a second optical signal, an optical fiber configured to propagate a third optical signal, wherein the third optical signal is not generated by the apparatus, an optical multiplexer configured to combine the first optical signal, the second optical signal, and the third optical signal into a composite WDM optical signal, and a wavelength locker configured to wavelength lock the first optical signal and the second optical signal, but not the third optical signal, wherein the first optical signal and the second optical signal are wavelength locked using a first dither frequency that is different than a second dither frequency used to lock the third optical signal, and wherein the first optical signal and the second optical signal share the first dither frequency using a time division multiplexing (TDM) wavelength locking scheme that is localized to the apparatus.

Also disclosed herein is a method comprising assigning, by a network manager, a first dither frequency to a first intermediate node in a network and a second dither frequency to a second intermediate node in the network, wherein the first dither frequency is different than the second dither frequency, providing, by the first intermediate node, wavelength locking to a first plurality of optical signals in a first WDM signal, wherein the first plurality of optical signals are generated by the first intermediate node and comprise the first dither frequency, but not the second dither frequency, providing, by the second intermediate node, wavelength locking to a second plurality of optical signals in a composite WDM signal that comprises both the second plurality of optical signals and at least some of the first plurality of optical signals, wherein the second plurality of optical signals are generated by the second intermediate node and comprise the second dither frequency, but not the first dither frequency; and transmitting, by the second intermediate node, the composite WDM signal to a third intermediate node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To provide wavelength locking in a plurality of channels in a WDM signal, the centralized wavelength locker may first need to isolate each output signal corresponding to the channels that will receive wavelength locking. One method for achieving such isolation in the WDM signal is to introduce a dither signal into the appropriate output signal. Specifically, a dither signal may comprise a low intensity singular tone (e.g., a small single tone component signal) that can be selectively introduced into an output signal and then used to distinguish the output signal from other output signals in a WDM signal. For instance, the WDM signal may be electronically filtered according to the frequency of the dither signal (dither frequency) to track a spectral component that carries the dither frequency. Various methods may exist for introducing dither signals into the output signal of a laser transmitter, such as by modulating the bias current of the transmitter at a rate that corresponds to the dither frequency. However, the centralized λ-locker can only isolate an output signal whose dither frequency is unique within the WDM signal, e.g., when no other output signals aside from the isolated output signal comprise a dither signal having the same dither frequency. As such, centralized wavelength locking schemes may use a multiple-access approach so that a single λ-locker may provide wavelength locking to multiple channels.

One centralized wavelength locking scheme may be a TDM wavelength locking scheme. The TDM wavelength locking scheme may sequentially introduce the same frequency dither signal into each of the optical channels according to a pre-determined sequence e.g., a TDM window comprising a plurality of timeslots (T1, T2, T3, etc.) assigned to the plurality of optical channels. The λ-locker may then track the spectral component corresponding to the dither frequency according to the pre-determined sequence, thereby isolating each output signal at the appropriate timeslot. Thereafter, the centralized λ-locker may detect the corresponding wavelength deviations in a manner similar to that used by the dedicated λ-locker. Hence, a TDM wavelength locking scheme may sequentially provide wavelength locking to each of the channels according to a TDM window.

Figure 1:
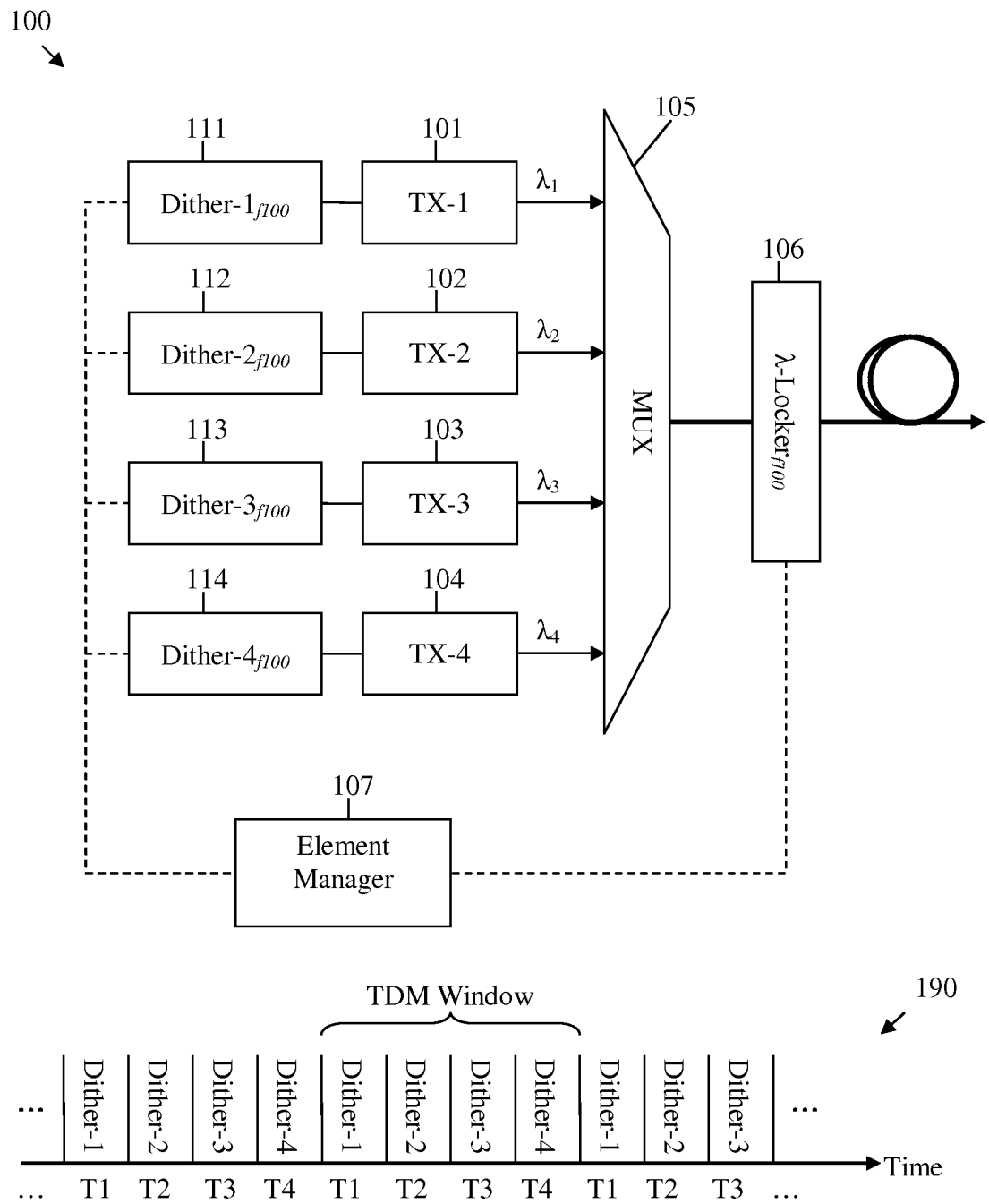
FIG. 1 illustrates an embodiment of a node for implementing a TDM wavelength locking scheme.

FIG. 1 illustrates an embodiment of a node 100 for implementing a centralized TDM wavelength locking scheme. The node 100 may comprise a first laser transmitter (TX-1) 101, a second laser transmitter (TX-2) 102, a third laser transmitter (TX-3) 103, a fourth laser transmitter (TX-4) 104, an optical multiplexer (MUX) 105, a λ-locker (λ-locker$_{f100}$) 106, an element manager 107, and a plurality of dither signal generators 111-114, arranged as shown in FIG. 1.

The laser transmitters 101-104 may be any devices used to transmit optical signals (e.g., output signals) in an optical network. In an embodiment, the TX-1 101 may be configured to transmit a first output signal ($\lambda_1$) in a first channel (CH1), the TX-2 102 may be configured to transmit a second output signal ($\lambda_2$) in a second channel (CH2), the TX-3 103 may be configured to transmit a third output signal ($\lambda_3$) in a third channel (CH3), and the TX-4 104 may be configured to transmit a fourth output signal ($\lambda_4$) in a fourth channel (CH4). Those of ordinary skill in the art will recognize that the node 100 may comprise any number of optical transmitters (e.g., TX-1, TX-2, ... TX-N, where N is an integer greater than 1) configured to transmit any number of output signals (e.g., $\lambda_1$, $\lambda_2$, ... $\lambda_n$, where n is an integer greater than 1) in any number of Channels (e.g., CH1, CH2 ... CHN), even though only four optical transmitters are described herein. The MUX 105 may be any device configured to multiplex a plurality of output signals into a WDM optical signal. The λ-locker$_{f100}$ 106 may be any device configured to detect wavelength drift in one or more output signals. The element manager 107 may be any device configured to coordinate TDM wavelength locking in the node 100.

The dither signal generators 111-114 may be any device or devices capable of introducing, or facilitating the introduction of, a dither signal into the output signals of the optical transmitters 101-104. For instance, the dither signal generators 111-114 may be configured to introduce a dither signal into the output signal by modulating the bias current of the transmitters 101-104. In an embodiment, the dither signal generators 111-114 may include: a first dither signal generator 111 configured to introduce a first dither signal (Dither-$1_{f100}$) into the $\lambda_1$; a second dither signal generator 112 configured to introduce a second dither signal (Dither-$2_{f100}$) into the $\lambda_2$; a third dither signal generator 113 configured to introduce a third dither signal (Dither-$3_{f100}$) into the $\lambda_3$; and a fourth dither signal generator 114 configured to introduce a fourth dither signal (Dither-$4_{f100}$) into the $\lambda_4$. In an embodiment, the Dither-$1_{f100}$, the Dither-$2_{f100}$, the Dither-$3_{f100}$, and the Dither-$4_{f100}$ may all comprise a first dither frequency ($f_{100}$). In the same or other embodiments, the $\lambda$-locker$_{f100}$ 106 may be configured to electronically filter the WDM signal according to the $f_{100}$.

In an embodiment, the element manager 107 may be configured to coordinate TDM wavelength locking in the node 100 by synchronizing the introduction of the dither signals into the output signals according to a predetermined sequence 190, and then communicating the predetermined sequence 190 to the $\lambda$-locker$_{f100}$ 106. For instance, the element manager may coordinate the introduction of the Dither-$1_{f100}$, the Dither-$2_{f100}$, the Dither-$3_{f100}$, and the Dither-$4_{f100}$ into the $\lambda_1$, the $\lambda_2$, the $\lambda_3$, and the $\lambda_4$ (respectively) according to the predetermined sequence 190. The pre-determined sequence 190 may comprise any method or manner of coordinating the introduction of the dither signals into the output signals with the detection of the corresponding output signals by the $\lambda$-locker$_{f100}$ 106. In an embodiment, the pre-determined sequence 190 may comprise a repetitious sequence of a TDM window comprising a plurality of timeslots (e.g., T1, T2, T3, and T4) that are assigned to the respective channels or dither signals. For instance, the TDM window may comprise a first timeslot (T1) assigned to the Dither-$1_{f100}$, a second timeslot (T2) assigned to the Dither-$2_{f100}$, a third timeslot (T3) assigned to the Dither-$3_{f100}$, and a fourth timeslot (T4) assigned to the Dither-$4_{f100}$.

The $\lambda$-locker$_{f100}$ 106 may use the pre-determined sequence 190 to determine which channel the isolated output signal corresponds to so that the correct target wavelength can be used to determine the corresponding wavelength deviation. For instance, the $\lambda$-locker$_{f100}$ 106 may determine the wavelength deviation of the $\lambda_1$ by comparing the isolated signal's wavelength to the CH1's target wavelength at the T1, the wavelength float of the $\lambda_2$ by comparing the isolated signal's wavelength to the CH2's target wavelength at the T2, the wavelength float of the $\lambda_3$ by comparing the isolated signal's wavelength to the CH3's target wavelength at the T3, and the wavelength float of the $\lambda_4$ by comparing the isolated signal's wavelength to the CH4's target wavelength at the T4. Subsequently (or concurrently), the $\lambda$-locker$_{f100}$ 106 may communicate the corresponding wavelength deviation to the element manager 107. Alternatively, the wavelength deviation may be communicated to a central processing unit (CPU) or third party device used to independently or collectively correct the output signals.

Conventional FDM wavelength locking may be one alternative to conventional TDM wavelength. In a conventional FDM wavelength locking scheme, the dither signals may be applied at the same time, but may comprise different dither frequencies. For instance, a dither signal comprising a unique dither signal (e.g., $f_{100}$, $f_{200}$, $f_{300}$ ... $f_{n\times100}$) may be continuously introduced into the various output signals ($\lambda_1$, $\lambda_2$, $\lambda_3$ ... $\lambda_n$) such that the resulting spectral components (each of which corresponding to a different dither frequency) may be contemporaneously (e.g., rather than sequentially) tracked to simultaneously isolate each of the output signals. Hence, the FDM wavelength locking scheme may use a dither signal comprising a unique dither frequency (e.g., $f_{100}$, $f_{200}$, $f_{300}$ ... $f_{n\times100}$) to isolate each of the output signals (e.g., $\lambda_1$, $\lambda_2$, and $\lambda_3$ ... $\lambda_n$).

Figure 2:
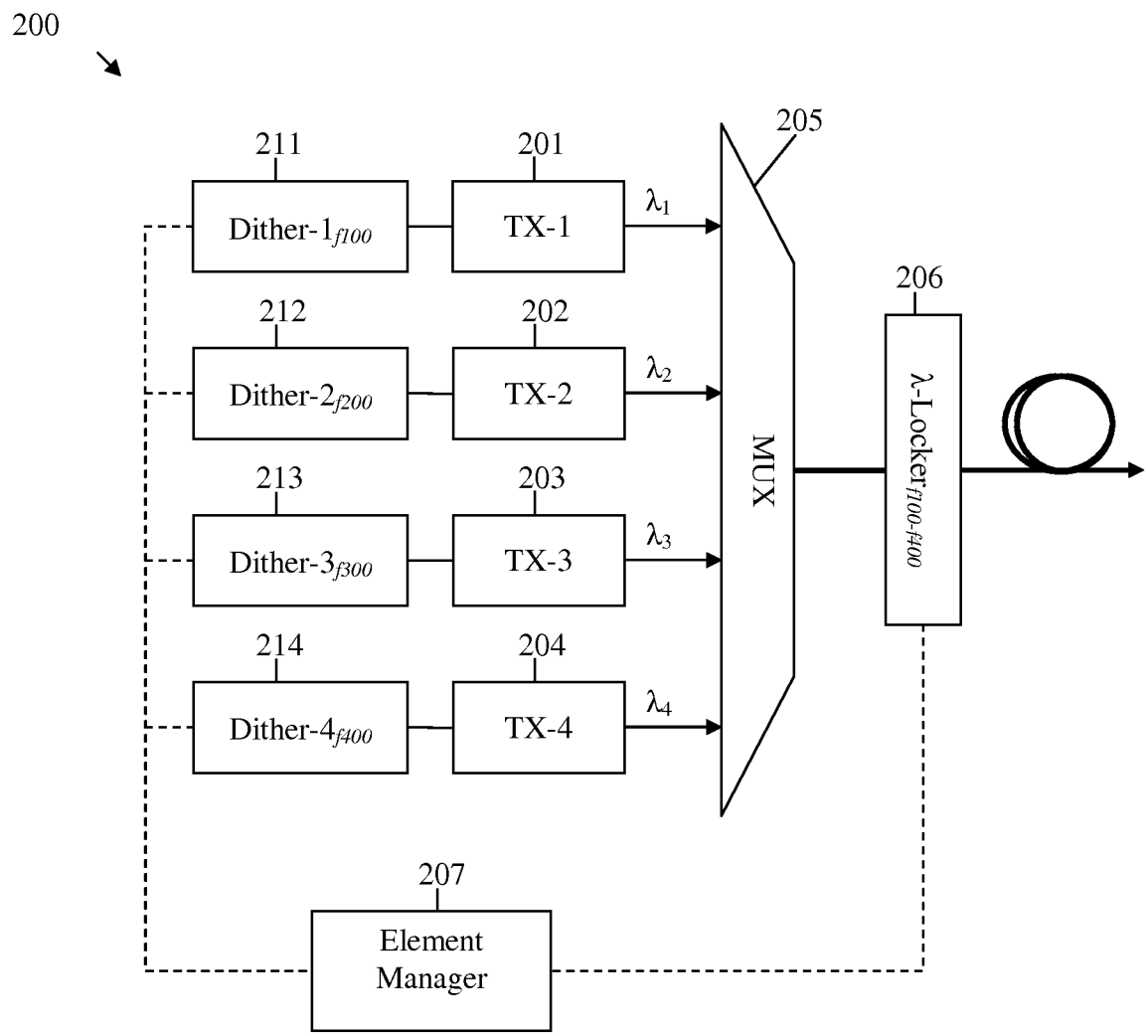
FIG. 2 illustrates an embodiment of a node for implementing a Frequency Division Multiplexed (FDM) wavelength locking scheme.

FIG. 2 illustrates an embodiment of a node 200 for implementing an FDM wavelength locking scheme. The node 200 may comprise a TX-1 201, a TX-2 202, a TX-3 203, a TX-4 204, a MUX 205, an FDM $\lambda$-locker ($\lambda$-locker$_{f100\text{-}f400}$) 206, an element manager 207, and a plurality of dither signal generators 211-214, arranged as shown in FIG. 2. The TX-1 201, the TX-2 202, the TX-3 203, the TX-4 204, and the MUX 205 may be configured substantially similar to the TX-1 101, the TX-2 102, the TX-3 103, the TX-4 104, and the MUX 105. In an embodiment, the TX-1 201, the TX-2 202, the TX-3 203, the TX-4 204 may be configured to transmit a $\lambda_1$, a $\lambda_2$, a $\lambda_3$, and a $\lambda_4$ (respectively) to the MUX 205, who may be configured to multiplex the $\lambda_1$, the $\lambda_2$, the $\lambda_3$, and the $\lambda_4$ into a WDM signal. The $\lambda$-locker$_{f100\text{-}f400}$ 206, the element manager 207, and the dither signal generators 211-214 may be configured somewhat similarly to the $\lambda$-locker$_{f100}$ 106, the element manager 107, and the dither signal generators 111-114, except that the $\lambda$-locker$_{f100\text{-}f400}$ 206, the element manager 207, and the dither signal generators 211-214 may be configured to implement an FDM wavelength locking scheme rather than a TDM wavelength locking scheme. Specifically, the dither signal generators 211-214 may be configured to generate a plurality of dither signals each of which may comprise a unique dither frequency (e.g., $f_{100}$, $f_{200}$, $f_{300}$, and $f_{400}$). For instance, the dither signal generators 211-214 may comprise: a first dither signal generator 211 configured to introduce a first dither signal comprising an $f_{100}$ (Dither-$1_{f100}$) into the $\lambda_1$; a second dither signal generator 212 configured to introduce a second dither signal comprising an second dither frequency ($f_{200}$) (Dither-$2_{f200}$) into the $\lambda_2$; a third dither signal generator 213 configured to introduce a third dither signal comprising a third dither frequency ($f_{300}$) (Dither-$3_{f300}$) into the $\lambda_3$; and a fourth dither signal generator 214 configured to introduce a fourth dither signal comprising a fourth dither frequency ($f_{400}$) (Dither-$4_{f400}$) into the $\lambda_4$, where $f_{100} \ne f_{200} \ne f_{300} \ne f_{400}$ (e.g., $f_{100} < f_{200} < f_{300} < f_{400}$). Accordingly, the element manager 207 may be configured to communicate the assigned dither frequencies (e.g., $f_{100}$ to CH1, $f_{200}$ to CH2, $f_{300}$ to CH3, $f_{400}$ to CH4, etc.) with the $\lambda$-locker$_{f100\text{-}f400}$ 206 so that the correct target wavelengths can be compared with the $\lambda_1$, the $\lambda_2$, the $\lambda_3$, and the $\lambda_4$ to determine the corresponding wavelength deviations. Subsequently, the element manager 207 may need to communicate any new or modified dither frequency assignment to the $\lambda$-locker$_{f100\text{-}f400}$ 206 (e.g., that a new dither frequency (e.g., $f_{n\times100}$) has been assigned to a newly added channel (e.g., CHN), that an existing channel's dither frequency assignment has been revoked/reassigned, etc.). The $\lambda$-locker$_{f100\text{-}f400}$ 206 may be configured to: isolate the $\lambda_1$ by electronically filtering a first portion of the WDM signal with a first radio-frequency (RF) filter comprising a passband centered around about the $f_{100}$; isolate the $\lambda_2$ by electronically filtering a second portion of the WDM signal with a second RF filter comprising a passband centered around about the $f_{200}$; isolate the $\lambda_3$ by electronically filtering a third portion of the WDM signal with a third RF filter comprising a passband centered around about the $f_{300}$; and isolate the $\lambda_4$ by electronically filtering a fourth portion of the WDM signal with a fourth RF filter comprising a passband centered around about the $f_{400}$. The remaining portion of the WDM signal may be transmitted downstream, e.g., without being filtered by the $\lambda$-locker$_{f100\text{-}f400}$. In some embodiments, the first, second, third, and forth portions of the WDM signal may collectively comprise only about a nominal portion (e.g., less than about one percent) of the entire WDM signal, while the remaining portion of the WDM signal may comprise a substantial portion (e.g., more than about ninety-nine percent) of the entire WDM signal. As such, diverting the first, second, third, and forth portions of the WDM signal may not substantially attenuate the WDM signal. In some embodiments, the entire WDM signal, the first, second, third, and forth portions of the WDM signal, and/or the remainder of the WDM signal may be amplified by some other optical component coupled to the λ-locker$_{f100-f400}$ (e.g., an amplifier). As such, the λ-locker$_{f100-f400}$ 206 may contemporaneously provide wavelength locking to each of the transmitters 201-204.

In summary, conventional centralized TDM and FDM wavelength locking schemes take different approaches to achieve centralized wavelength locking in DWDM networks. The TDM wavelength locking scheme sequentially isolates a plurality of output signals (e.g., $\lambda_1, \lambda_2, \lambda_3, \ldots \lambda_n$) by tracking a single spectral component corresponding to a single dither frequency (e.g., $f_{100}$) according to a pre-determined TDM window (e.g., $\lambda_1$ at T1, $\lambda_2$ at T2, ... $\lambda_n$ at TN, etc.). In contrast, the FDM wavelength locking scheme isolates a plurality of output signals (e.g., $\lambda_1, \lambda_2, \lambda_3, \ldots \lambda_n$) by tracking a plurality of unique spectral components each of which correspond to a different dither frequency (e.g., $f_1, f_2, f_3 \ldots f_n$). Each approach may have its advantages/disadvantages depending on the network environment, architecture, etc. For instance, conventional FDM λ-lockers may be somewhat more costly than their TDM counterparts because FDM λ-lockers may employ a plurality of electronic filters (e.g., rather than just one electronic filter) such that the WDM signal may be filtered according to a plurality of dither frequencies. That is to say, λ-lockers comprising more electronic filters may, ceteris paribus, be more expensive than λ-lockers comprising fewer electronic filters. On the other hand, implementing a centralized TDM wavelength locking approach may introduce complexities into the wavelength locking scheme due to the synchronization required to distribute a single dither frequency amongst a plurality of channels, e.g., especially in DWDM networks comprising many channels. Nevertheless, both the conventional centralized TDM wavelength locking scheme and the conventional centralized FDM wavelength locking scheme may be suitable and/or cost-effective for providing centralized wavelength locking in relatively simple DWDM networks, e.g., point-to-point (P2P) DWDM networks.

Figure 3:
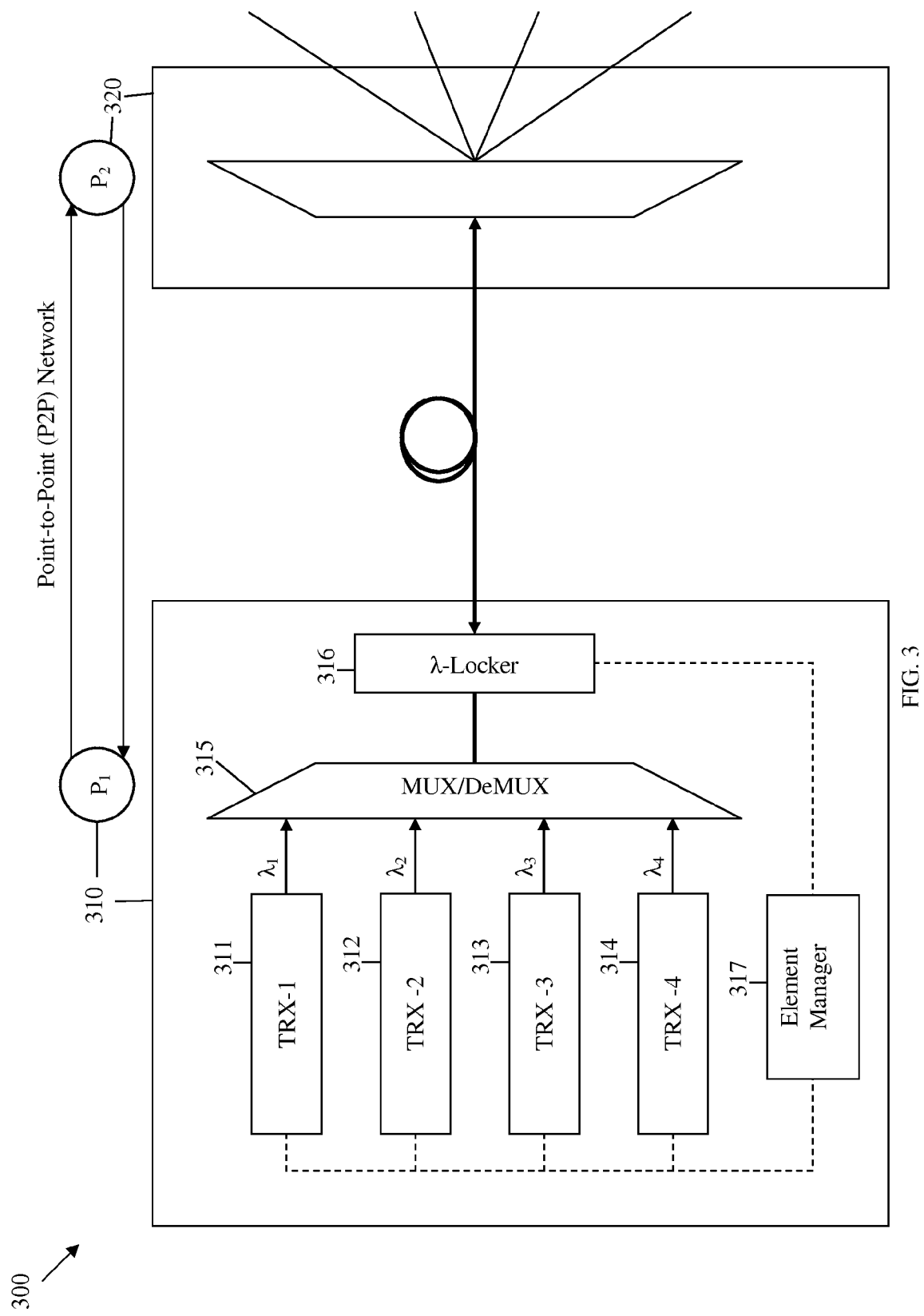
FIG. 3 illustrates an embodiment of a point-to-point (P2P) DWDM network.

FIG. 3 illustrates a point-to-point (P2P) DWDM network 300. The term 'point-to-point' may be used in this disclosure to describe networks that do not comprise intermediate nodes configured to add/drop wavelengths to/from the WDM signal. For instance, the P2P DWDM network 300 may distribute the WDM optical signal to a plurality of subscribers (not shown), and hence may technically be a point-to-multipoint (P2MP) network. However, the P2P DWDM network 300 may nevertheless be referred to herein as a 'point-to-point' network because no wavelengths are added to the WDM signal by intermediate nodes prior to the WDM signal reaching a destination.

The P2P DWDM network 300 may comprise a first node 310 corresponding to a first point and a second node 320 corresponding to a second point. The first node 310 may be any device configured to transmit a WDM signal to the second node 320, and may comprise a plurality of transponders 311-314, an MUX 315, a λ-locker 316, and an element manager 317, arranged as shown in FIG. 3. The transponders 311-314 may be any component or group of components that comprise the functionality of a transmitter and, optionally, the functionality of a dither signal generator. For instance, the transponders 311-314 may comprise an on-board transmitter and an on-board dither signal generator, or, alternatively, may comprise a stand-alone transmitter coupled to a stand-alone dither signal generator. Accordingly, the transponders 311-314 may generate or emit optical output signals (e.g., $\lambda_1, \lambda_2, \lambda_3$, and $\lambda_4$) that comprise a plurality of dither signals (e.g., Dither-1, Dither-2, Dither-3, and Dither-4). For instance, the dither transponders 311-314 may comprise: a first transponder (TRX-1) 311 configured to transmit a $\lambda_1$ comprising a Dither-1 in a CH1; a second transponder (TRX-2) 312 configured to transmit a $\lambda_2$ comprising a Dither-2 in a CH2; a third transponder (TRX-3) 313 configured to transmit a $\lambda_3$ comprising a Dither-3 in a CH3; and a fourth transponder (TRX-4) 314 configured to transmit a $\lambda_4$ comprising a Dither-4 in a CH4. The MUX 315 may be configured substantially similar to the MUX 105.

The first node 310 may be configured to implement either a TDM wavelength locking architecture or an FDM wavelength locking architecture. For instance, the Dither-1, the Dither-2, the Dither-3, and the Dither-4 may comprise substantially the same dither frequency (e.g., $f_{100}$) when the node 310 is configured to implement a conventional TDM wavelength locking scheme. Alternatively, the Dither-1, the Dither-2, the Dither-3, and the Dither-4 may comprise substantially unique dither frequencies (e.g., $f_{100}, f_{200}, f_{300}$, and $f_{400}$) when the node 310 is configured to implement a conventional FDM wavelength locking scheme. Accordingly, the λ-locker 316 and the element manager 317 may be configured substantially similar to the λ-locker$_{f100}$ 106 and the element manager 107 when the first node 310 is configured to implement a conventional TDM wavelength locking scheme. Alternatively, the λ-locker 316 and the element manager 317 may be configured substantially similar to the λ-locker$_{f100-f400}$ 206 and the element manager 207 when the first node 310 is configured to implement an FDM wavelength locking scheme.

Conventional centralized wavelength locking schemes, such as the TDM and FDM wavelength locking schemes described above, may be well suited and cost effective for simple optical networks, such as the P2P DWDM network 300. However, conventional centralized wavelength locking schemes may be ill suited and/or less cost effective for large, complex optical networks, such as DWDM networks comprising one or more intermediate nodes that are configured to add/drop channels to/from the WDM signal. See, e.g., FIG. 4, infra. For instance, conventional centralized TDM wavelength locking schemes may require massive synchronization at the network level when multiple intermediate nodes are located remotely from one another, e.g., by several kilometers (km). Correspondingly, conventional centralized FDM wavelength locking schemes may require massive coordinate at the network level such that each channel is associated with a different dither frequency. For instance, dither frequencies may occasionally need to be re-assigned (e.g., when new channels are added, existing channels are removed, etc.), thereby causing substantial portions of the network to be occasionally shut down or put off-line to implement the re-assignment. For example, it may be important that all parties involved in a dither frequency assignment/re-assignment coordinate their actions (e.g., the parties start and stop using the dither frequency at the same time that the λ-locker re-associates the dither frequency with updated channel assignment) so that errors do not occur. Hence, conventional centralized TDM or FDM wavelength locking schemes may require substantial synchronization and/or coordination at the network level. Additionally, dither signals that are generated remotely may be substantially attenuated upon reaching the TDM or FDM λ-locker, thereby making it difficult to track the corresponding spectral component in the WDM signal. As such, implementation and/or maintenance of conventional centralized TDM or FDM wavelength locking schemes may become unpractical in large, complex, and/or evolving DWDM networks, thereby reducing the scalability of conventional centralized approaches.

Further, conventional TDM and FDM centralized wavelength locking schemes (i.e., using one λ-locker for the entire network) may be unable to provide wavelength locking to all channels or transmitters in some complex DWDM networks. For instance, some DWDM networks may use different wavelengths on different segments (e.g., use $\lambda_1$-$\lambda_{10}$ on a first segment and $\lambda_{11}$-$\lambda_{20}$ on a second segment, etc.), and consequently there may be no suitable location to place a centralized λ-locker in the DWDM network, e.g., there may be no stretch of fiber that carries all wavelengths. See, e.g., FIG. 4, infra. The same or other DWDM networks may reuse wavelengths on various segments (e.g., use $\lambda_1$ to carry a first signal on a first segment, drop $\lambda_1$ at the end of the first segment, and then re-use $\lambda_1$ to carry a second signal on a second segment). See, e.g., FIG. 4, infra (eastbound traffic $\lambda_{j+1}$-$\lambda_k$ is used between $P_1$ and $P_2$, dropped at $P_2$, and then re-used between $P_3$ and $P_4$). In such networks, multiple λ-lockers may be required to provide wavelength locking to all transponders. However, distributing conventional TDM λ-lockers throughout the network (e.g., according to a conventional TDM wavelength locking scheme that synchronizes multiple TDM λ-lockers) may require that even more parties be coordinated/synchronized (e.g., additional λ-lockers), thereby making synchronization at the network level even more challenging. Likewise, distributing conventional FDM λ-lockers throughout the network (e.g., according to a conventional FDM wavelength locking scheme that uses multiple FDM λ-lockers) may substantially increase the cost of providing wavelength locking in the DWDM network (e.g., due to number of relatively expensive FDM λ-lockers). Additionally, network administrators may find it difficult to coordinate the allocation of large numbers of dither frequencies in a distributed FDM network, especially as channels/wavelengths are added and/or dropped at various remote node locations. Hence, distributing multiple FDM capable λ-lockers throughout the network may substantially increase the cost of providing wavelength locking in the DWDM network. As such, a simpler and/or more cost effective scheme for providing wavelength locking in DWDM networks is desired.

Disclosed herein is a shared wavelength locking scheme for using multiple shared λ-lockers to provide wavelength locking to a large number of transponders in a DWDM network. The shared wavelength locking scheme may distribute shared λ-lockers to a plurality of intermediate nodes, e.g., any remote nodes comprising add/drop sites. Each shared λ-locker may be configured to provide wavelength locking only to those output signals that are generated locally, while ignoring output signals that are not generated locally. For instance, a distributed λ-locker may provide wavelength locking to any output signals that are generated by the hosting or proximately located intermediate node, while ignoring output signals that are not generated by the hosting or proximately intermediate node. The distributed λ-locker may differentiate locally generated output signals from non-locally generated output signals according to the former's inclusion of a unique dither frequency, which may serve as an RF identification (ID) tag. For instance, each intermediate node may be assigned a unique dither frequency (e.g., $P_1$, $P_2$, ... and $P_N$ may be assigned $f_{100}$, $f_{200}$, and $f_{N\times100}$, respectively) such that only those output signals generated at the given intermediate node may comprise the corresponding dither frequency. Accordingly, the shared λ-locker may be configured to electronically filter the WDM signal according to the corresponding unique dither frequency, thereby isolating the locally generated output signals from the non-locally generated output signals. The shared λ-lockers and element managers may then provide wavelength locking to the local transmitters according to a localized TDM wavelength locking scheme.

The shared wavelength locking scheme may offer several advantages over conventional centralized wavelength locking schemes. For instance, each shared λ-locker may electronically filter the WDM signal at only the corresponding dither frequency (rather than at a plurality of dither frequencies), thereby allowing the shared λ-lockers to comprise fewer electronic components than conventional FDM λ-lockers (e.g., which may typically comprise as many as one RF filter per channel). Thus, the shared wavelength locking scheme may offer cost savings over distributed FDM wavelength locking schemes. Further, the shared wavelength locking scheme may only need localized synchronization, rather than network-wide synchronization, e.g., as would be required by a conventional distributed TDM wavelength locking schemes. For instance, the shared λ-lockers may only need to communicate with a network manager upon initialization, e.g., when the locker is physically installed at a node, to receive a unique dither frequency assignment. Subsequently (e.g., after receiving the unique dither frequency assignment), the shared λ-locker may operate substantially independently such that no further network level coordination is required with respect to wavelength locking. Consequently, the management of wavelength locking at the respective intermediate nodes may be substantially localized, thereby avoiding many of the problems associated with coordinating multi-component synchronization on the network level. As such, the shared wavelength locking scheme may be more scalable for large/complex DWDM networks than conventional TDM or FDM wavelength locking schemes.

Figure 4:
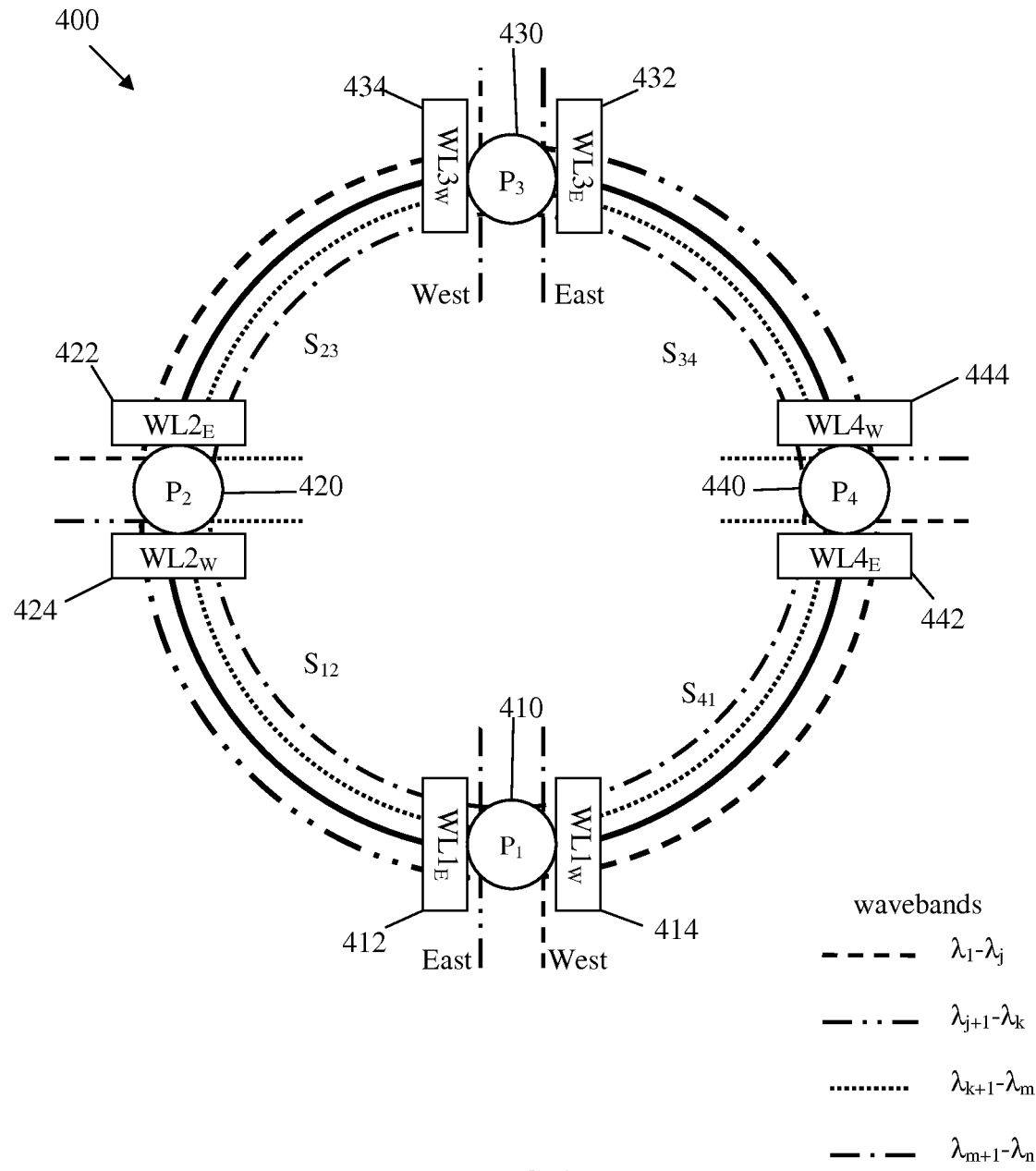
FIG. 4 illustrates an embodiment of a complex DWDM network.

FIG. 4 illustrates a network architecture 400 for implementing a shared wavelength locking scheme. In an embodiment, the network architecture 400 may be similar to ring type architectures that may commonly be found in metropolitan (metro) and/or regional DWDM networks. The network 400 may comprise a first node ($P_1$) 410, a first eastern λ-locker ($WL1_E$) 412, a first western λ-locker ($WL1_W$) 414, a second node ($P_2$) 420, a second eastern λ-locker ($WL2_E$) 422, a second western λ-locker ($WL2_W$) 424, a third node ($P_3$) 430, a third eastern λ-locker ($WL3_E$) 432, a third western λ-locker ($WL3_W$) 434, a fourth node ($P_4$) 440, a fourth eastern λ-locker ($WL4_E$) 442, and a fourth first western λ-locker ($WL4_W$) 444, arranged as shown in FIG. 4. The nodes 410-440 may communicate with one another via an optical communication medium, shown by the center ring (i.e., the solid ring), which may carry traffic in both an 'East' direction (e.g., a clockwise direction) and a 'West' direction (e.g., a counterclockwise direction). Hence, traffic propagated in the 'East' direction may be referred to herein as 'eastbound traffic', while traffic propagated in the 'West' direction may be referred to as 'westbound traffic'. The traffic may be carried in a WDM signal comprising a plurality of wavelengths ($\lambda_1$-$\lambda_n$). The WDM signal may be broken up into four bands; a first band ($\lambda_1$-$\lambda_j$), a second band ($\lambda_{j+1}$-$\lambda_k$), a third band ($\lambda_{k+1}$-$\lambda_m$), and a fourth band ($\lambda_{m+1}$-$\lambda_n$), where j is an integer greater than 1, k is an integer greater than j, m is an integer greater than j, and n is an integer greater than m (e.g., j<k<m<n). The network architecture may be divided into four segments, a first segment ($S_{12}$) spanning between the $P_1$ 410 and the $P_2$ 420, a second segment ($S_{23}$) spanning between the $P_2$ 420 and the $P_3$ 430, a third segment ($S_{34}$) spanning between the $P_3$ 430 and the $P_4$ 440, and a fourth segment ($S_{41}$) spanning between the $P_4$ 440 and the $P_1$ 410.

The $\lambda_1$-$\lambda_j$ may be represented as a dashed line in the network architecture 400, and may be used to carry traffic communicated between the $P_2$ 420 and the $P_3$ 430 over the $S_{23}$. For instance, the $P_2$ 420 may send the $\lambda_1$-$\lambda_j$ to the $P_3$ 430 as eastbound traffic (e.g., via $S_{23}$), while the $P_3$ 430 may send the $\lambda_1$-$\lambda_j$ to the $P_2$ 420 as westbound traffic (e.g., via $S_{23}$). Additionally, the $\lambda_1$-$\lambda_j$ may be re-used to carry traffic communicated between the $P_4$ 440 and the $P_1$ 410 over the $S_{41}$. For instance, the $P_4$ 440 may send the $\lambda_1$-$\lambda_j$ to the $P_1$ 410 as eastbound traffic (e.g., via $S_{41}$), while the $P_1$ 410 may send the $\lambda_1$-$\lambda_j$ to the $P_4$ 440 as westbound traffic (e.g., via $S_{41}$).

The $\lambda_{j+1}$-$\lambda_k$ may be represented as a dot-dot-dashed line in the network architecture 400, and may be used to carry traffic communicated between the P1 410 and the $P_2$ 420 over the $S_{12}$. For instance, the $P_1$ 410 may send the $\lambda_{j+1}$-$\lambda_k$ to the $P_2$ 420 as eastbound traffic (e.g., via $S_{12}$), while the $P_2$ 420 may send the $\lambda_{j+1}$-$\lambda_k$ to the $P_1$ 410 as westbound traffic (e.g., via $S_{12}$). Additionally, the $\lambda_{j+1}$-$\lambda_k$ may be re-used to carry traffic communicated between the $P_3$ 430 and the $P_4$ 440 over the $S_{34}$. For instance, the $P_3$ 430 may send the $\lambda_{j+1}$-$\lambda_k$ to the $P_4$ 440 as eastbound traffic (e.g., via $S_{34}$), while the $P_4$ 440 may send the $\lambda_{j+1}$-$\lambda_k$ to the $P_3$ 430 as westbound traffic (e.g., via $S_{34}$).

The $\lambda_{k+1}$-$\lambda_m$ may be represented as a dotted line in the network architecture 400, and may be used to carry traffic communicated between the $P_2$ 420 and the $P_4$ 440 over two paths, $S_{12}$/$S_{41}$ and $S_{34}$/$S_{23}$. For instance, the $P_2$ 420 may send the $\lambda_{k+1}$-$\lambda_m$ to the $P_4$ 440 as eastbound traffic (e.g., via $S_{23}$ and $S_{34}$) or as westbound traffic (e.g., via $S_{12}$ and $S_{41}$), while the $P_4$ 440 may send the $\lambda_{k+1}$-$\lambda_m$ to the $P_2$ 420 as eastbound traffic (e.g., via $S_{41}$ and $S_{12}$), or as westbound traffic (e.g., via $S_{34}$ and $S_{23}$). Accordingly, neither the $P_1$ 410 nor the $P_3$ 430 may be configured to add or drop any of wavelengths/signals within the $\lambda_{k+1}$-$\lambda_m$.

The $\lambda_{m+1}$-$\lambda_n$ may be represented as a dot-dashed line in the network architecture 400, and may be used to carry traffic communicated between the $P_1$ 410 and the $P_3$ 430 over all of the $S_{12}$, the $S_{23}$, the $S_{34}$, and $S_{41}$. For instance, the $P_1$ 410 may send the $\lambda_{m+1}$-$\lambda_n$ to the $P_3$ 430 as eastbound traffic (e.g., via $S_{12}$ and $S_{23}$) or as westbound traffic (e.g., via $S_{41}$ and $S_{34}$), while the $P_3$ 430 may send the $\lambda_{m+1}$-$\lambda_n$ to the $P_1$ 410 as eastbound traffic (e.g., via $S_{34}$ and $S_{41}$) or as westbound traffic (e.g., via $S_{23}$ and $S_{12}$). Accordingly, neither the $P_2$ 420 nor the $P_4$ 440 may be configured to add or drop any of wavelengths/signals within the $\lambda_{m+1}$-$\lambda_n$.

In an embodiment, a unique dither frequency may be assigned to each of the $P_1$ 410, the $P_2$ 420, the $P_3$ 430, and the $P_4$ 440. For instance, an $f_{100}$ may be assigned to the $P_1$ 410, an $f_{200}$ may be assigned to the $P_2$ 420, an $f_{300}$ may be assigned to the $P_3$ 430, and an $f_{400}$ may be assigned to the $P_4$ 440. Accordingly, a dither frequency signal comprising the respective assigned dither frequencies may be included in the output signals generated by the $P_1$ 410, the $P_2$ 420, the $P_3$ 430, and the $P_4$ 440. For instance, the $P_1$ 410 may include a dither signal corresponding to the $f_{100}$ (Dither$_{f100}$) in each of its output signals in a TDM manner, the $P_2$ 420 may include a dither signal corresponding to the $f_{200}$ (Dither$_{f200}$) in each of its output signals, the $P_3$ 430 may include a dither signal corresponding to the $f_{300}$ (Dither$_{f200}$) in each of its output signals, and the $P_4$ 440 may include a dither signal corresponding to the $f_{400}$ (Dither$_{f400}$) in each of its output signals.

The WL1$_E$ 412, the WL1$_W$ 414, the WL2$_E$ 422, the WL2$_W$ 424, the WL3$_E$ 432, the WL3$_W$ 434, the WL4$_E$ 442, and the WL4$_W$ 444 may be shared λ-lockers that are configured to provide wavelength locking to their corresponding nodes according to the shared wavelength locking scheme. For instance: the WL1$_E$ 412 and the WL1$_W$ 414 may provide wavelength locking to signals generated by the $P_1$ 410 by electronically filtering the WDM signals according to the $f_{100}$; the WL2$_E$ 422 and the WL2$_W$ 424 may provide wavelength locking to signals generated by the $P_2$ 420 by electronically filtering the WDM signals according to the $f_{200}$; the WL3$_E$ 432 and the WL3$_W$ 434 may provide wavelength locking to signals generated at the $P_3$ 430 by electronically filtering the WDM signals according to the $f_{300}$; and the WL4$_E$ 442 and the WL4$_W$ 444 may provide wavelength locking to signals generated at the $P_4$ 440 by electronically filtering the WDM signals according to the $f_{400}$.

In an embodiment, each of the WL1$_E$ 412 and the WL2$_E$ 422, the WL3$_E$ 432, and the WL4$_E$ 442 may provide wavelength locking to eastbound traffic generated by the $P_1$ 410, the $P_2$ 420, the $P_3$ 430, and the $P_4$ 440 (respectively), while each of the WL1$_W$ 414, the WL2$_W$ 424, the WL3$_W$ 434, and the WL4$_W$ 444 may provide wavelength locking to westbound traffic generated by the $P_1$ 410, the $P_2$ 420, the $P_3$ 430, and the $P_4$ 440 (respectively).

In an embodiment, the WL1$_E$ 412 may provide wavelength locking to all eastbound traffic (e.g., $\lambda_{j+1}$-$\lambda_k$ and $\lambda_{m+1}$-$\lambda_n$) transmitted by the $P_1$ 410 over the $S_{12}$, but may ignore all other eastbound traffic (e.g., $\lambda_{k+1}$-$\lambda_m$), while the WL1$_W$ 414 may provide wavelength locking to all westbound traffic (e.g., $\lambda_1$-$\lambda_j$ and $\lambda_{m+1}$-$\lambda_n$) transmitted by the $P_1$ 410 over the $S_{41}$, but may ignore all other westbound traffic (e.g., $\lambda_{k+1}$-$\lambda_m$).

In an embodiment, the WL2$_E$ 422 may provide wavelength locking to the eastbound traffic (e.g., $\lambda_1$-$\lambda_j$ and $\lambda_{k+1}$-$\lambda_m$) transmitted by the $P_2$ 420 over the $S_{23}$, but may ignore all other eastbound traffic (e.g., $\lambda_{m+1}$-$\lambda_n$). The WL2$_W$ 424 may provide wavelength locking to all westbound traffic (e.g., $\lambda_{j+1}$-$\lambda_k$ and $\lambda_{k+1}$-$\lambda_m$) transmitted by the $P_2$ 420 over the $S_{12}$, but may ignore all other westbound traffic (e.g., $\lambda_{mk+1}$-$\lambda_n$).

In an embodiment, the WL3$_E$ 432 may provide wavelength locking to the eastbound traffic (e.g., $\lambda_{j+1}$-$\lambda_k$ and $\lambda_{m+1}$-$\lambda_n$) transmitted by the $P_3$ 430 over the $S_{34}$, but may ignore all other eastbound traffic (e.g., $\lambda_{k+1}$-$\lambda_m$), while the WL3$_W$ 434 may provide wavelength locking to all westbound traffic (e.g., $\lambda_1$-$\lambda_j$ and $\lambda_{m+1}$-$\lambda_n$) transmitted by the $P_3$ 430 over the $S_{23}$, but may ignore all other westbound traffic (e.g., $\lambda_{k+1}$-$\lambda_m$).

In an embodiment, the WL4$_E$ 442 may provide wavelength locking to the eastbound traffic (e.g., $\lambda_1$-$\lambda_j$ and $\lambda_{k+1}$-$\lambda_m$) transmitted by the $P_4$ 440 over the $S_{41}$, but may ignore all other eastbound traffic (e.g., $\lambda_{m+1}$-$\lambda_n$) transmitted over $S_{41}$, while the WL4$_W$ 444 may provide wavelength locking to all westbound traffic (e.g., $\lambda_{j+1}$-$\lambda_k$ and $\lambda_{k+1}$-$\lambda_m$) transmitted by the $P_4$ 440 over the $S_{34}$, but may ignore all other westbound traffic (e.g., $\lambda_{m+1}$-$\lambda_n$) transmitted over $S_{41}$.

In an embodiment, each of the WL1$_E$ 412, the WL1$_W$ 414, the WL2$_E$ 422, the WL2$_W$ 424, the WL3$_E$ 432, the WL3$_W$ 434, the WL4$_E$ 442, and the WL4$_W$ 444 may sequentially provide wavelength locking according to their own localized TDM sequence (e.g., two separate TDM windows per node: one for locally generated eastbound traffic and one for locally generated westbound traffic). One or more of the individual channels may be locally disabled and/or locally enabled by the assigned node without intervention and/or cooperation on the network level in respect to wavelength locking, e.g., without coordination by a network manager. For example, the $P_1$ 410 may locally disable/enable any channel corresponding to eastbound traffic ($\lambda_{j+1}$-$\lambda_k$ and $\lambda_{m+1}$-$\lambda_n$) or westbound traffic ($\lambda_1$-$\lambda_j$ and $\lambda_{m+1}$-$\lambda_n$), the P$_2$ 420 may locally disable/enable any channel corresponding to eastbound traffic (e.g., $\lambda_1$-$\lambda_j$ and $\lambda_{k+1}$-$\lambda_m$) or westbound traffic ($\lambda_{j+1}$-$\lambda_k$ and $\lambda_{k+1}$-$\lambda_m$), the P$_3$ 430 may locally disable/enable any channel corresponding to eastbound traffic ($\lambda_{j+1}$-$\lambda_k$ and $\lambda_{m+1}$-$\lambda_n$) or westbound traffic ($\lambda_1$-$\lambda_j$ and $\lambda_{m+1}$-$\lambda_n$), and the P$_4$ 440 may locally disable/enable any channel corresponding to eastbound traffic ($\lambda_1$-$\lambda_j$ and $\lambda_{k+1}$-$\lambda_m$) or westbound traffic ($\lambda_{j+1}$-$\lambda_k$ and $\lambda_{k+1}$-$\lambda_m$). In some embodiments, locally enabling/disabling a channel may comprise assigning/revoking a timeslot assignment in the relevant localized TDM sequence/window, but may not comprise changing any existing dither frequency assignments.

Figure 5:
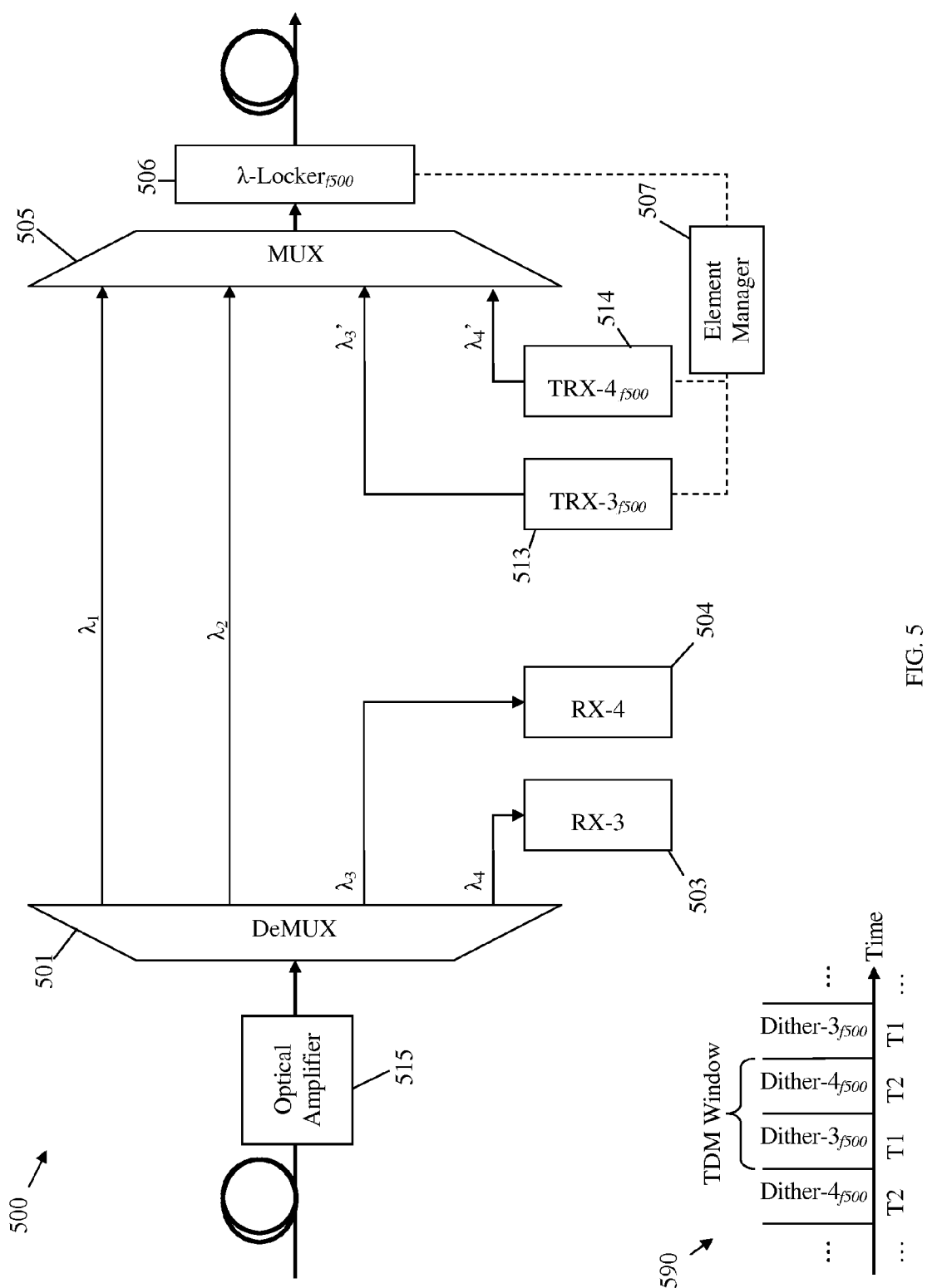
FIG. 5 illustrates an embodiment of an intermediate node configured to implement a shared wavelength locking scheme.

FIG. 5 illustrates an embodiment of an intermediate node 500 that may be used in a shared wavelength locking network. The intermediate node 500 may be assigned a fifth dither frequency (f$_{500}$), and may comprise a demultiplexer (De-MUX) 501, a receiver for a third channel (RX-3) 503, a receiver for a fourth channel (RX-4) 504, a TRX-3$_{f500}$ 513, a TRX-4$_{f500}$ 514, an optical amplifier 515, a MUX 505, a $\lambda$-locker$_{f500}$ 506, and an element manager 507. The optical amplifier may be any device or component capable of amplifying a WDM optical signal. For instance, the optical amplifier 515 may be configured to receive a WDM signal (e.g. from an upstream node), amplify the WDM signal, and forward the amplified WDM signal to the DeMUX 501. The DeMUX 501 may be any optical component or device capable of de-multiplexing a WDM signal into a plurality of optical signals corresponding to a plurality of channels. For instance, the DeMUX 501 may de-multiplex the amplified WDM optical signal into a $\lambda_1$ corresponding to a CH1, a $\lambda_2$ corresponding to a CH2, a $\lambda_3$ corresponding to a CH3, and a $\lambda_4$ corresponding to a CH4. The RX-3 503 and RX-4 504 may be any component capable of receiving an optical signal. For instance, the RX-3 503 and RX-4 504 may be configured to receive $\lambda_3$ and $\lambda_4$, respectively. The TRX-3$_{f500}$ 513 and the TRX-4$_{f500}$ 514 may be configured somewhat similarly to the TRX-3 313 and the TRX-4 314 as described above. In an embodiment, the TRX-3$_{f500}$ 513 and the TRX-4$_{f500}$ 514 may be configured to transmit optical signals $\lambda_3'$ and $\lambda_4'$ in the CH3 and the CH4, respectively. The $\lambda_3'$ may comprise substantially the same wavelength, but different data, than the $\lambda_3$, and the $\lambda_4'$ may comprise substantially the same wavelength, but different data, than the $\lambda_4$. Hence, the intermediate node 500 may re-use the wavelengths corresponding to $\lambda_3$ and the $\lambda_4$ to carry the $\lambda_3'$ and the $\lambda_4'$.

The $\lambda$-locker$_{f500}$ 506 may be configured to provide wavelength locking to the TRX-3$_{f500}$ 513 and the TRX-4$_{f500}$ 514 to correct wavelength drift in the $\lambda_3'$ and the $\lambda_4'$, respectively, but may otherwise ignore (i.e., not provide wavelength locking to) the optical signals $\lambda_1$ and $\lambda_2$. For instance, the TRX-3$_{f500}$ 513 and the TRX-4$_{f500}$ 514 may be configured to introduce a Dither-3$_{f500}$ and a Dither-4$_{f500}$ into the $\lambda_3'$ and the $\lambda_4'$, respectively. The Dither-3$_{f500}$ and the Dither-4$_{f500}$ may correspond to the f$_{500}$, which may be unique to the intermediate node 500 such that no signals generated in other network nodes comprise a dither signal corresponding to the f$_{500}$. In an embodiment, the Dither-3$_{f500}$ and the Dither-4$_{f500}$ may comprise the same dither signal that is introduced into the CH3 and the CH4 at different times. Hence, the $\lambda_1$ and $\lambda_2$ may not comprise a dither signal having the f$_{500}$, and therefore the $\lambda_3'$ and $\lambda_4'$ may be isolated from the $\lambda_1$ and $\lambda_2$ by electronically filtering the WDM signal according to the f$_{500}$.

In an embodiment, the TRX-3$_{f500}$ 513, the TRX-4$_{f500}$ 514, the $\lambda$-locker$_{f500}$ 506, and the element manager 507 may be configured to implement a localized TDM wavelength locking scheme. For instance, the element manager may coordinate a localized synchronization of the TRX-3$_{f500}$ 513, the TRX-4$_{f500}$ 514, and the $\lambda$-locker$_{f500}$ 506 according to a predetermined localized sequence 590. Pursuant to the predetermined localized sequence 590, the TRX-3$_{f500}$ 513 and the TRX-4$_{f500}$ 514 may coordinate their introductions of the Dither-3$_{f500}$ and the Dither-4$_{f500}$ into the $\lambda_3'$ and $\lambda_4'$ (respectively) with the $\lambda$-locker$_{f500}$'s 506 sequential detection of the wavelength drift associated with the $\lambda_3'$ and $\lambda_4'$. The predetermined localized sequence 590 may comprise a localized TDM window comprising a T1 and a T2 that are allocated to the Dither-3$_{f500}$ and the Dither-4$_{f500}$ (respectively). In an embodiment, the TDM window may not comprise any timeslots corresponding to non-locally generated output signals (e.g., $\lambda$1 and $\lambda_2$). In an embodiment, the localized TDM window may not be communicated to any devices or components outside of the intermediate node 500, e.g., may not be communicated to a centralized network manager or coordinated with any other intermediate nodes, e.g., the TDM window may be communicated via a separate communication channel or medium in the intermediate node 500. In other embodiments, the localized TDM window may be indirectly communicated outside of the intermediate node 500 (e.g., as overhead in the WDM signal), but may not provide synchronization to any other intermediate nodes (e.g., other nodes/network-devices may be configured to ignore the overhead containing the localized TDM window).

Figure 6:
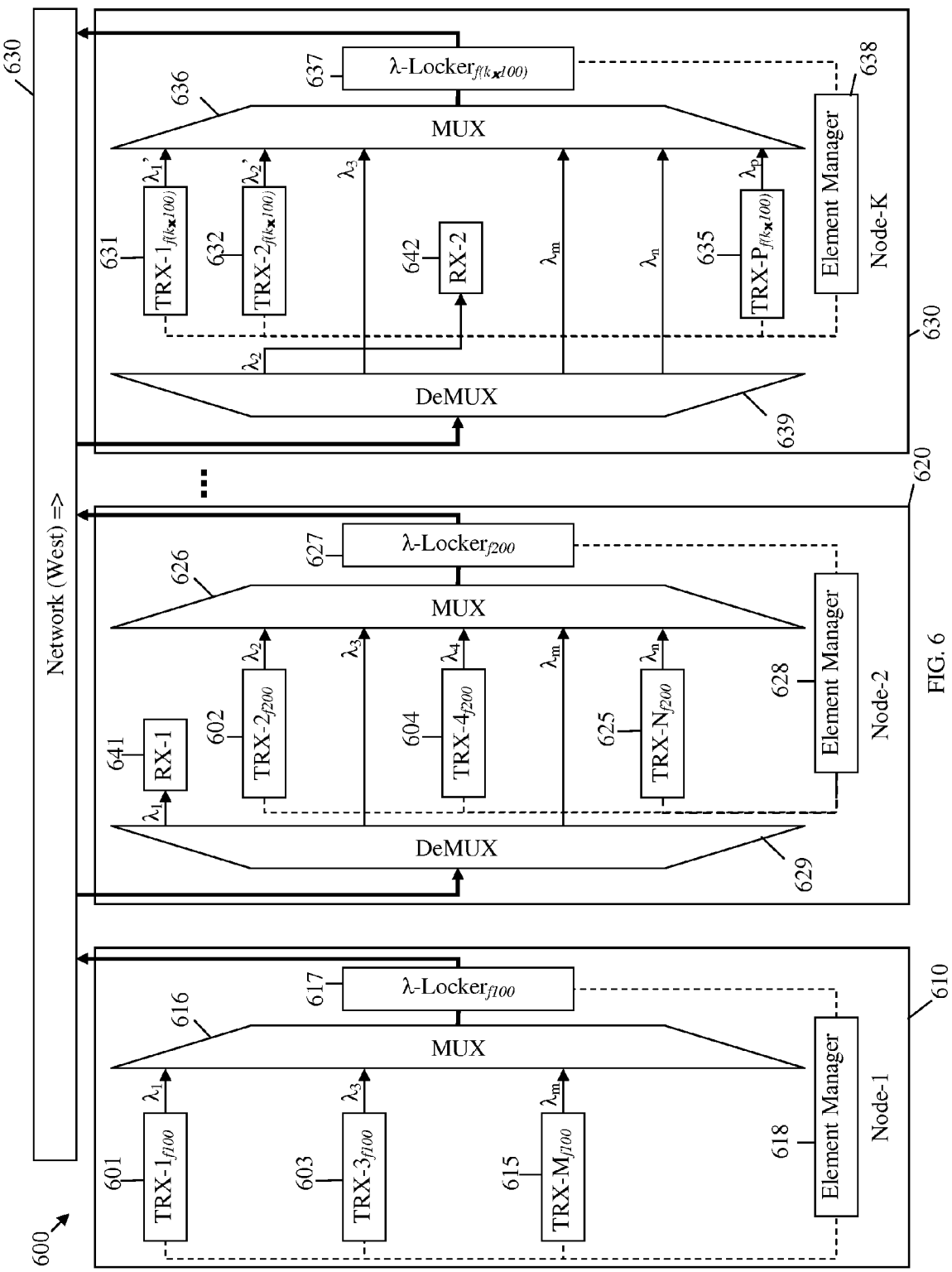
FIG. 6 illustrates an embodiment of a network architecture for implementing a shared wavelength locking scheme.

FIG. 6 illustrates another embodiment of a network architecture 600 for implementing a shared wavelength locking scheme. The network architecture 600 may comprise a plurality of nodes 610-630 and an optical network 650. The plurality of nodes 610-630 may be configured substantially similar to the intermediate node 500, with each of the nodes 610-630 being assigned a unique dither frequency. For instance, a first node (node-1) 610 may be assigned the f$_{100}$, a second node (node-2) 620 may be assigned the f$_{200}$, and a K$^{th}$ node (node-K) 630 may be assigned a k$^{th}$ dither frequency (f$_{k \times 100}$), where K is an integer greater than 2, and k is an integer greater than 2. The optical network 650 may comprise any passive or active distribution network configured to transport a WDM signal between the nodes 610-630. The MUX 616, the $\lambda$-locker$_{f100}$ 617, and the element manager 618 may be configured substantially similarly to the MUX 505, the $\lambda$-locker$_{f100}$ 506, and the element manager 507.

The node-1 610 may comprise a TRX-1$_{f100}$ 601, a TRX-3$_{f100}$ 603, a TRX-M$_{f100}$ 615, a MUX 616, a $\lambda$-locker$_{f100}$ 617, and an element manager 618, arranged as shown in FIG. 6. The TRX-1$_{f100}$ 601, the TRX-3$_{f100}$ 603, and the TRX-M$_{f100}$ 615 may be configured to transmit a $\lambda_1$, a $\lambda_3$, and a $\lambda_m$ to the MUX 616. In an embodiment, the TRX-1$_{f100}$ 601, the TRX-3$_{f100}$ 603, and the TRX-M$_{f100}$ 615 may sequentially introduce a Dither-1$_{f100}$, a Dither-3$_{f100}$, and a dither signal corresponding to the CHM (Dither-M$_{f100}$) into the $\lambda_1$, the $\lambda_3$, and the $\lambda_m$ (respectively) according to a first localized sequence, which may be provided by the element manager 618. In an embodiment, the Dither-1$_{f100}$, the Dither-3$_{f100}$, and the Dither-M$_{f100}$ may comprise the same dither signal inserted into different channels at different times. Upon receiving the output signals, the MUX 616 may multiplex the $\lambda_1$, the $\lambda_3$, and the $\lambda_m$ (e.g., as well as one or more signals that may have been generated locally by another transmitter located with the node-1, such as a $\lambda_5$, ... a $\lambda_{m-2}$, etc.) to form the first WDM signal, which may thereafter be forwarded to the $\lambda$-locker$_{f100}$ 617. Specifically, the $\lambda_1$, the $\lambda_3$, and the $\lambda_m$ may be carried in a CH1, a CH3, and an M$^{th}$ channel (CHM), respectively, of the first WDM signal. The first localized sequence may be configured substantially similarly to the localized sequence 590, and may comprise a plurality of timeslots allocated to the channels carrying the locally generated output signals. Each of the Dither-$1_{f100}$, the Dither-$3_{f100}$, and the Dither-$M_{f100}$ may comprise the $f_{100}$, and may be associated with their own respective timeslot in the first localized sequence, e.g., a timeslot assigned to the corresponding locally generated output signal. The first localized sequence may be further communicated to the λ-locker$_{f100}$ 617 by the element manager 618 such that a detection of the wavelength deviation in each of the CH1, the CH3, and the CHM, can be synchronized with the introduction of the Dither-$1_{f100}$, the Dither-$3_{f100}$, and the Dither-$M_{f100}$ (respectively) into the $λ_1$, $λ_3$, and $λ_m$ (respectively). In an embodiment, the first localized sequence may not be communicated outside the node-1 610 such that the first localized sequence is localized to the node-1 610. In another embodiment, the first localized sequence may be indirectly communicated outside of the node-1 610 (e.g., in the WDM overhead), but may not be used to synchronize wavelength locking in any other nodes. That is to say, the first localized sequence may be locally relevant, but may not be globally relevant.

The node-2 620 may comprise a TRX-$2_{f200}$ 602, a TRX-$4_{f200}$ 604, a TRX-$N_{f200}$ 625, an MUX 626, a λ-locker$_{f100}$ 627, an element manager 628, a DeMUX 629, and an RX-1 641, arranged as shown in FIG. 6. The MUX 626, the λ-locker$_{f100}$ 627, the element manager 628, the DeMUX 629, and the RX-1 641 may be configured somewhat similarly to the MUX 505, λ-locker$_{f500}$ 506, the element manager 507, the DeMUX 501, and the RX-3 503. In an embodiment, the node-2 620 may be coupled directly downstream from the node-1 610 such that the node-2 620 receives the first WDM signal. The first WDM signal may be demultiplexed by the DeMUX 629 into the $λ_1$, the $λ_3$, and the $λ_m$. The $λ_1$ may be received by the RX-1 641, e.g., may be dropped from the WDM signal by the node-2 620, while the $λ_3$ and the $λ_m$ may be forwarded to the MUX 627. In an embodiment, the TRX-$2_{f200}$ 602, the TRX-$4_{f200}$ 604, and the TRX-$N_{f200}$ 625 may transmit a $λ_2$, a $λ_4$, and a $λ_m$ (respectively) in a CH2, a CH4, and an $N^{th}$ channel (CHN) (respectively) of a second WDM signal. Specifically, the MUX 626 may multiplex the $λ_2$, the $λ_3$, the $λ_4$, the $λ_m$, and the $λ_n$ to form the second WDM signal, which may be forwarded to the λ-locker$_{f200}$ 627. Those of ordinary skill in the art will recognize that the second WDM signal may comprise one or more additional locally generated signals (e.g., $λ_{n-4}$, $λ_{n-2}$, etc.) and/or one or more additional remotely generated signals (e.g., $λ_{m-4}$, $λ_{m-2}$, etc).

In an embodiment, the TRX-$2_{f200}$ 602, the TRX-$4_{f200}$ 604, and the TRX-$N_{f200}$ 625 may sequentially introduce a Dither-$2_{f200}$, a Dither-$4_{f200}$, and a dither signal corresponding to the CHN (Dither-$N_{f200}$) into the $λ_2$, the $λ_4$, and the $λ_n$ (respectively) according to a second localized sequence provided by the element manager 628, where each of the Dither-$2_{f200}$, the Dither-$4_{f200}$, and the Dither-$N_{f200}$ comprise the $f_{200}$. In an embodiment, the Dither-$2_{f200}$, the Dither-$4_{f200}$, and the Dither-$N_{f200}$ may comprise the same dither signal introduced into the CH2, CH4, and CHN at different times. The second localized sequence may be somewhat similar to the first localized sequence, but may be localized to the node-2 620, rather than the node-1 610. The second localized sequences and may be communicated to the λ-locker$_{f200}$ 627 by the element manager 628 such that the λ-locker$_{f200}$ 627 can coordinate the detection of wavelength deviation in each of the CH2, the CH4, and the CHN with the sequential introduction of the Dither-$2_{f200}$, the Dither-$4_{f200}$, and the Dither-$N_{f200}$ (respectively) into the $λ_2$, the $λ_4$, and the $λ_n$ (respectively). In an embodiment, the second localized sequence may not be related to the first localized sequence, and may not be communicated to any network components outside of node-2 620.

In other embodiments, the second localized sequence may be indirectly communicated to, but ignored by, remotely located network components such that the second localized sequence may be locally relevant to node-2 620, but may not be globally relevant, e.g., may not be used to synchronize wavelength locking in remote nodes.

The node-K 630 may comprise a TRX-$1_{f(k×100)}$ 631, a TRX-$2_{f(k×100)}$ 632, a TRX-$P_{f(k×100)}$ 635, a MUX 636, a λ-locker$_{f(k×100)}$ 637, an element manager 638, a DeMUX, 639, and an RX-2 642, arranged as shown in FIG. 6. The node-K 630 may be configured somewhat similarly to the node-2 620 and/or the node-1 610. For instance, the node-K 630 may be configured to receive the second WDM signal (or a composite signal comprising at least some common wavelengths with the second WDM signal), drop the $λ_2$ from the second WDM signal, and add a $λ_1'$, a $λ_2'$, and a $λ_p$ to the $λ_3$, the $λ_4$, the $λ_m$, and the $λ_n$ to, e.g., with appropriate amplification, produce a third WDM signal. The components of node-3 630 may be configured somewhat similarly to the corresponding components of the node-2 620. In an embodiment, the DeMUX 639 may receive the second WDM signal, and demultiplex the second WDM signal into the $λ_2$, the $λ_3$, the $λ_4$, the $λ_m$, and the $λ_n$. The DeMUX 639 may forward the $λ_2$ to the RX-2 642, which may receive the $λ_2$ (e.g., thereby dropping the $λ_2$ from the second WDM signal). The DeMUX 639 may forward the $λ_3$, the $λ_4$, the $λ_m$, and the $λ_n$ to the MUX 636. In an embodiment, the TRX-$1_{f(k×100)}$ 631, the TRX-$2_{f(k×100)}$ 632, and the TRX-$P_{f(k×100)}$ 635 may transmit the $λ_1'$, the $λ_2'$, and the $λ_p$ in the CH1, the CH2, and a $P^{th}$ channel (CHP), respectively, of the third WDM signal. Specifically, the $λ_1'$ and the $λ_2'$ may comprise the same wavelengths, but different data than the $λ_1$ and the $λ_2$. Hence, the node-K 630 may reuse the wavelengths associated with the $λ_1$ and $λ_2$. The MUX 637 may multiplex the $λ_1'$, the $λ_2'$, the $λ_p$, the $λ_3$, the $λ_4$, the $λ_m$, and the $λ_n$ to produce the third WDM signal. In an embodiment, the TRX-$1_{f(k×100)}$ 631, the TRX-$2_{f(k×100)}$ 632, the TRX-$P_{f(k×100)}$ 635 may introduce a Dither-$1_{f(k×100)}$, a Dither-$2_{f(k×100)}$, and a dither signal corresponding to the CHP (Dither-$P_{f(k×100)}$) into the $λ_1'$, $λ_2'$, and $λ_p$ (respectively) according to a third localized sequence provided by the element manager 638, where each of the Dither-$1_{f(k×100)}$, the Dither-$2_{f(k×100)}$, and the Dither-$P_{f(k×100)}$ comprise the $f_{(k×100)}$. In an embodiment, the Dither-$1_{f(k×100)}$, the Dither-$2_{f(k×100)}$, and the Dither-$P_{f(k×100)}$ may comprise the same dither signal introduced into the CH1, CH2, and CHP at different times. The third localized sequence may be substantially similar to the first localized sequence, and may be provided to the λ-locker$_{f(k×100)}$ 637 such that the detection of the wavelength drift in each of the $λ_1'$, the $λ_2'$, and the $λ_n$ can be synchronized with the introduction of the Dither-$1_{f(k×100)}$, the Dither-$2_{f(k×100)}$, and the Dither-$P_{f(k×100)}$ (respectively). The λ-locker$_{f(k×100)}$ 637 may electronically filter a portion of the third WDM signal according to the $f_{(k×100)}$, thereby isolating the $λ_1'$, the $λ_2'$, and the $λ_p$ from the $λ_3$, the $λ_4$, the $λ_m$, and the $λ_n$. Subsequently, wavelength locking may be provided to the $λ_1'$, the $λ_2'$, and the $λ_p$ by the λ-locker$_{f(k×100)}$ 637 and the element manager 638 according to the methods described above.

As demonstrated by the network architecture 600, the shared wavelength locking scheme may be easily scalable to large/complex networks, e.g., metro and/or regional optical networks. For instance, the nodes 610-630, as well as one or more intermediate nodes positioned between the node-2 620 and the node-K 630 (e.g., node-3, node-4, . . . node-(K−1)) may each be assigned a unique dither frequency (e.g., $f_{100}$, $f_{200}$, . . . $f_{(k×100)}$) such that wavelength locking can be completely localized. This may prevent conflicts between channels (e.g., or two channels comprising the same dither frequency at the same time) such that the λ-lockers 617-637 can differentiate locally generated output signals from remotely generated output signals. One additional advantage is that new nodes may be added without reconfiguring existing nodes with respect to wavelength locking, and that additional channels can be added/removed in existing nodes without network-wide coordination. For instance, a network manager may add a node-(K+1) without disturbing wavelength locking in the nodes 610-630 by provisioning a new dither frequency (e.g., $f_{(k+1)\times 100}$). Additionally or alternatively, the node-K 630 may add a new channel (e.g., corresponding to a TRX-(p+1)) without needing to coordinate wavelength locking (e.g., frequencies, timeslots, etc.) with any other nodes in the network 600, e.g., without requiring communication with a network manager regarding wavelength locking for the TRX-(p+1). Likewise, a channel and/or node can be removed without a substantial amount of network level coordination with respect to wavelength locking. Hence, the shared wavelength locking scheme may be well-suited for growing/evolving networks or networks that may be restructured in the future.

Figure 7:
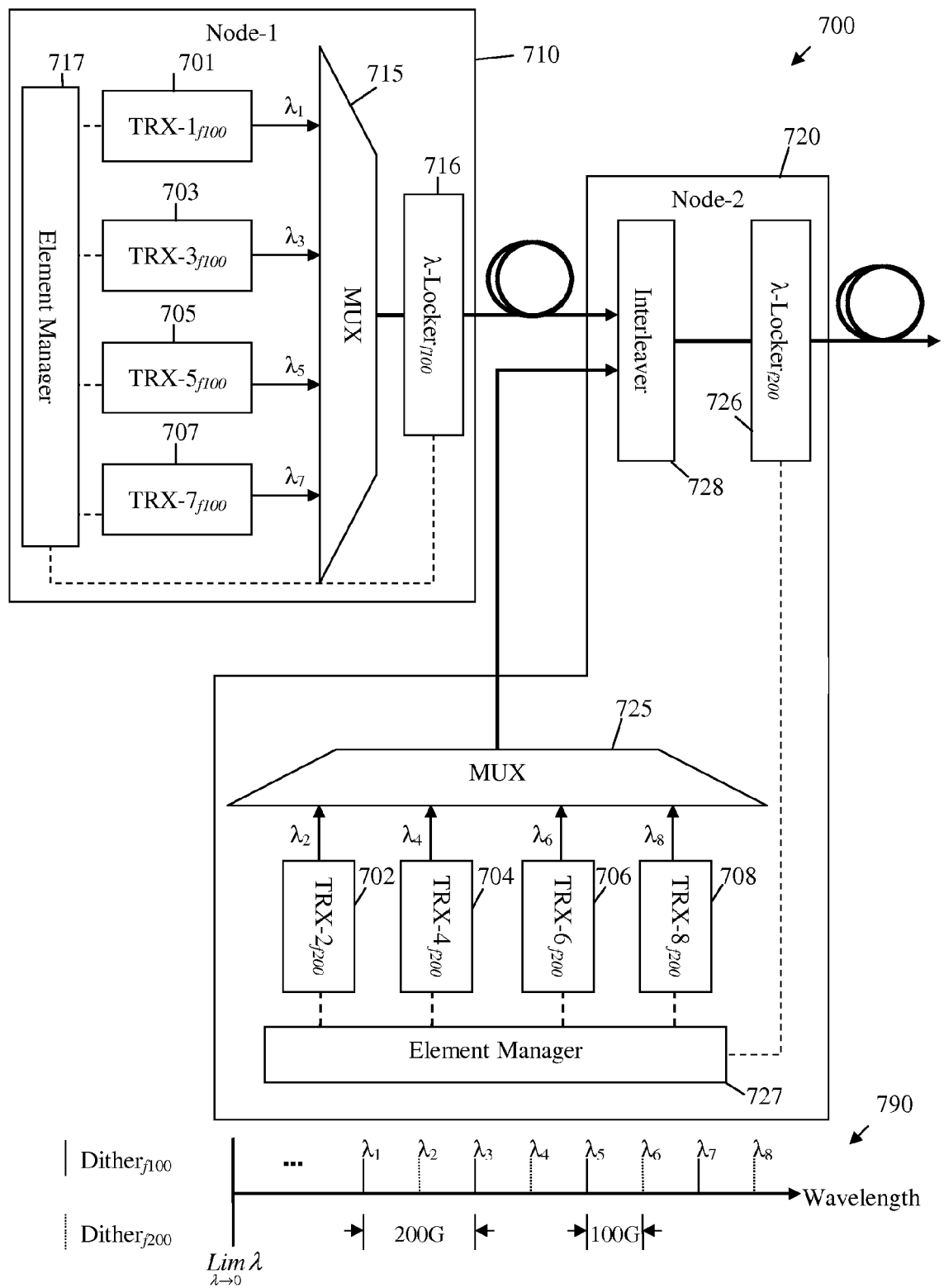
FIG. 7 illustrates another embodiment of a network architecture for implementing a shared wavelength locking scheme.

FIG. 7 illustrates an embodiment of a network architecture 700 for implementing a shared wavelength locking architecture. The network architecture may comprise a node-1 710 and a node-2 720, configured as shown in FIG. 7. In an embodiment, the node-1 710 and the node-2 720 may be remotely located intermediate nodes, and may be configured similarly to the intermediate node 500 and/or one of the node-1 610, the node-2 620, or the node-K 630. In an embodiment, the node-1 710 may comprise a TRX-$1_{f100}$ 701, a TRX-$3_{f100}$ 703, a TRX-$5_{f100}$ 705, a TRX-$7_{f100}$ 707, a MUX 715, a λ-locker$_{f100}$ 716, and an element manager 717. In an embodiment, the TRX-$1_{f100}$ 701, the TRX-$3_{f100}$ 703, the TRX-$5_{f100}$ 705, and the TRX-$7_{f100}$ 707 may be configured to transmit a $\lambda_1$, a $\lambda_3$, a $\lambda_5$, and a $\lambda_7$ (respectively) down a CH1, a CH3, a CH5, and a CH7 (respectively) of a first WDM signal. In an embodiment, the TRX-$1_{f100}$ 701, the TRX-$3_{f100}$ 703, the TRX-$5_{f100}$ 705, and the TRX-$7_{f100}$ 707 may introduce a Dither-$1_{f100}$, a Dither-$3_{f100}$, a Dither-$5_{f100}$, and a Dither-$7_{f100}$ (respectively) into the $\lambda_1$, the $\lambda_3$, the $\lambda_5$, and the $\lambda_7$ (respectively) according to a first localized sequence, e.g., a predetermined sequence that is localized to the node-1 710. The Dither-$1_{f100}$, the Dither-$3_{f100}$, the Dither-$5_{f100}$, and the Dither-$7_{f100}$ may each comprise an $f_{100}$, which may be uniquely assigned to the node-1 710. In an embodiment, the Dither-$1_{f100}$, the Dither-$3_{f100}$, the Dither-$5_{f100}$, and the Dither-$7_{f100}$ may comprise the same dither signal introduced into the CH1, CH3, a CH5, and a CH7 at different times. The MUX 715, the λ-locker$_{f100}$ 716, and the element manager 717 may be configured similarly to the MUX 505, the λ-locker$_{f500}$ 506, and the element manager 507.

The node-2 720 may comprise a TRX-$2_{f200}$ 702, a TRX-$4_{f200}$ 704, a TRX-$6_{f600}$ 706, a TRX-$8_{f200}$ 708, a MUX 725, a λ-locker$_{f200}$ 726, an element manager 727, and an interleaver 728. The TRX-$2_{f200}$ 702, the TRX-$4_{f200}$ 704, the TRX-$6_{f600}$ 706, and the TRX-$8_{f200}$ 708 may be configured to transmit a $\lambda_2$, a $\lambda_4$, a $\lambda_6$, and a $\lambda_8$ (respectively) down a CH2, a CH4, a CH6, and a CH8 (respectively) of a second WDM signal. In an embodiment, TRX-$2_{f200}$ 702, the TRX-$4_{f200}$ 704, the TRX-$6_{f600}$ 706, and the TRX-$8_{f200}$ 708 may introduce a Dither-$2_{f200}$, a Dither-$4_{f200}$, a Dither-$6_{f200}$, and a Dither-$8_{f200}$ (respectively) into the $\lambda_2$, the $\lambda_4$, the $\lambda_6$, and the $\lambda_8$ (respectively) according to an appropriate localized sequence, e.g., a predetermined sequence that is localized to the node-2 720. The Dither-$2_{f200}$, the Dither-$4_{f200}$, the Dither-$6_{f200}$, and the Dither-$8_{f200}$ may each comprise an $f_{200}$, which may be uniquely assigned to node-2 720. In an embodiment, the Dither-$2_{f200}$, the Dither-$4_{f200}$, the Dither-$6_{f200}$, and the Dither-$8_{f200}$ may comprise the same dither signal introduced into the CH2, the CH4, the CH6, and the CH8 at different times. The MUX 725, the λ-locker$_{f200}$ 726, and the element manager 727 may be configured similarly to the MUX 715, the λ-locker$_{f100}$ 716, and the element manager 717. The interleaver 728 may be any device used to combine two multiplexed WDM signals into a composited WDM signal. For instance, the interleaver 728 may comprise a 3-port optical device that is used to combine two sets of DWDM channels (e.g., odd and even channels) into a composite WDM signal stream. As used herein, composite WDM signals may refer to any WDM signal that comprises a wavelength, channel, or output signal that was previously carried in another WDM signal, and is not necessarily used only in the context of interleavers. For instance, the second WDM signal broadcast by the node-2 620 may be considered as a composite WDM signal because it has at least one common output signal from the first WDM signal broadcast by the node-1 610.

In an embodiment, the composite WDM signal emitted from the interleaver 728 may comprise an optical spectrum 790. The optical spectrum 790 may comprise a wavelength/channel spacing of about 200 GHz between even channels (e.g., 200 GHz between $\lambda_2$ and $\lambda_4$, 200 GHz between $\lambda_4$ and $\lambda_6$, and 200 GHz between $\lambda_6$ and $\lambda_8$), as well as a wavelength/channel spacing of about 200 GHz between odd channels (e.g., 200 GHz between $\lambda_1$ and $\lambda_3$, 200 GHz between $\lambda_3$ and $\lambda_5$, and 200 GHz between $\lambda_5$ and $\lambda_7$). In an embodiment, the optical spectrum 790 may comprise be a wavelength spacing of about 100 GHz between even and odd channels (e.g., 100 GHz between $\lambda_1$ and $\lambda_2$, 100 GHz between $\lambda_2$ and $\lambda_3$, ... and 100 GHz between $\lambda_7$ and $\lambda_8$). In other embodiments, the channel spacing may vary (e.g., odd-odd and even-odd channel spacing of 100 GHz and 50 GHz respectively) The λ-locker$_{f200}$ 726 may be configured to filter the composite WDM signal according to the $f_{200}$, and hence may provide wavelength locking to the output signals corresponding to the even channels (e.g., the $\lambda_2$, the $\lambda_4$, the $\lambda_6$, and the $\lambda_8$), while ignoring the output signals corresponding to the odd channels (e.g., $\lambda_1$, the $\lambda_3$, the $\lambda_5$, and the $\lambda_7$).

Figure 8:
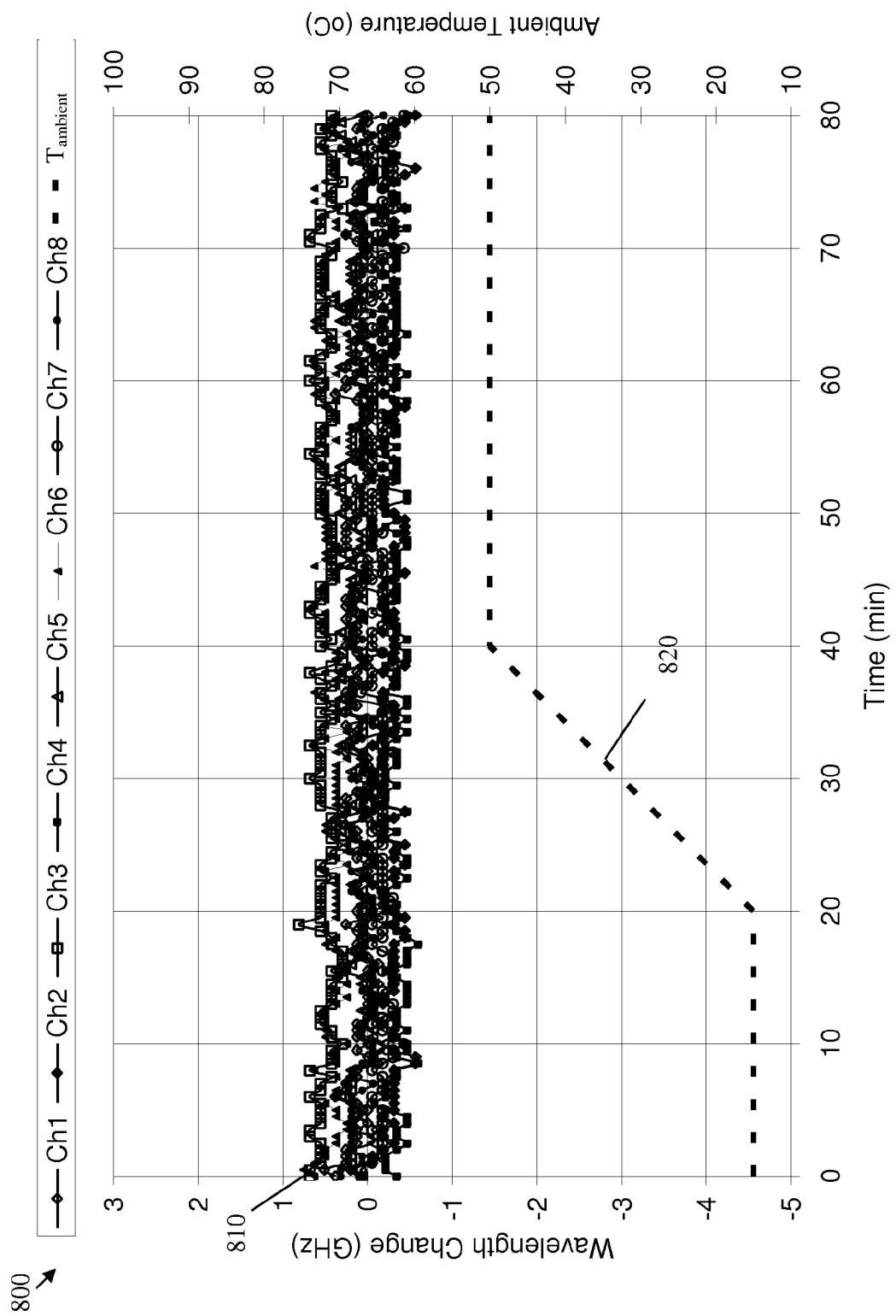
FIG. 8 is a graph that tracks wavelength drift in a shared wavelength locking network architecture.

The shared wavelength locking scheme has been found to be effective in providing wavelength locking under some test scenarios. FIG. 8 illustrates a graph 800 that tracks wavelength locking in a test condition network architecture similar to the network architecture 700. Notably, the test was conducted for twelve channels, although only eight channels are shown in herein for purposes of clarity and brevity. The Applicants submit that the results for wavelength locking in the other four channels (CH9 thru CH12, not shown) were substantially consistent with the results for wavelength locking for the eight channels discussed herein (CH1 thru CH8), and hence their inclusion herein would be duplicative. The graph 800 depicts changes in wavelength for output signals 801 corresponding with a plurality of channels (CH1 thru CH8) as an ambient temperature ($T_{ambient}$) 802 of the test condition network architecture was increased. In practice, changes in ambient temperature may cause, or significantly affect, wavelength drift in output signals because changing the operating conditions (e.g., operating temperature) of the laser transmitter substantially affects their ability to maintain a target wavelength. As shown, the output signal 801 maintained a delta wavelength of less than +/−1 GHz from their target wavelength as the $T_{ambient}$ 802 was varied at a rate of a 1.7° C. per minute. Hence, the shared wavelength locking scheme effectively provides wavelength locking even when the ambient temperature varies rapidly.

Figure 9:
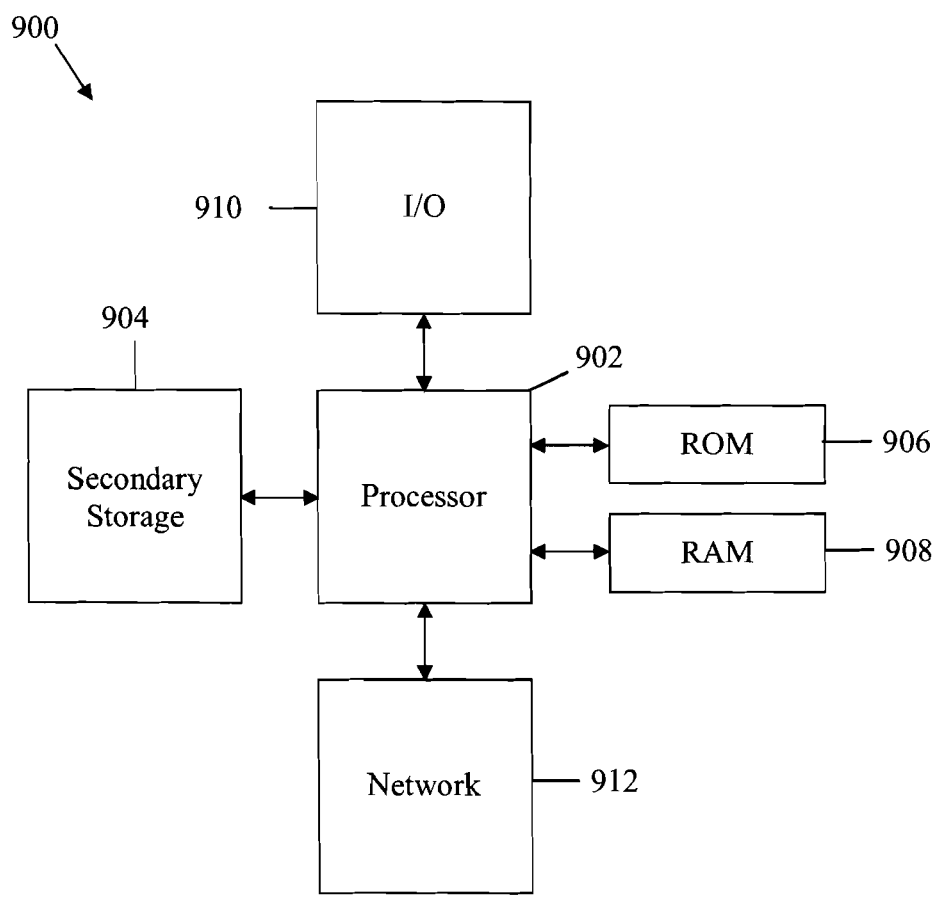
FIG. 9 is an embodiment of a general-purpose computer system.

FIG. 9 illustrates a typical, general-purpose computer, suitable for implementing one or more embodiments of any component disclosed herein. The computer 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than access to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   at least one processor configured to:
   receive a wavelength division multiplexed (WDM) signal from a remote node, wherein the WDM signal comprises a first channel carrying a first remotely generated signal, a second channel carrying a second remotely generated signal, and a third channel;
   adapt the WDM signal into a composite WDM signal by: dropping the first remotely generated signal from the first channel; adding a first locally generated signal to the first channel; and adding a second locally generated signal to the third channel; and
   provide wavelength locking to the first locally generated signal and the second locally generated signal without providing wavelength locking to the second remotely generated signal based on a dither frequency associated with the apparatus.

2. The apparatus of claim 1, wherein the remote node is associated with a first unique dither frequency, wherein the dither frequency associated with the apparatus is a second unique dither frequency, and wherein the first unique dither frequency is not the same as the second unique dither frequency.

3. The apparatus of claim 2, wherein the second remotely generated signal comprises a first dither signal, but not a second dither signal,
   wherein the first locally generated signal and the second locally generated signal comprise the second dither signal, but not the first dither signal,
   wherein the first dither signal comprises the first unique dither frequency, but not the second dither frequency, and
   wherein the second dither signal comprises the second unique dither frequency, but not the first dither frequency.

4. The apparatus of claim 3, wherein the second dither signal is sequentially introduced into the first locally generated signal and the second locally generated signal such that the first locally generated signal and the second locally generated signal never comprise the second dither signal at the same time.

5. The apparatus of claim 3, wherein the second dither signal is introduced into the first locally generated signal and the second locally generated signal according to a first time-division-multiplexed (TDM) window such that:
  the second dither signal is applied to the first locally generated signal during a first time slot, but not during a second timeslot; and
  the second dither signal is applied to the second locally generated signal during the second timeslot, but not during the first timeslot, and
  wherein the first TDM window is localized to the apparatus such that the apparatus does not communicate the first TDM window to the remote node or any other network component that is not located within the apparatus.

6. The apparatus of claim 5, wherein wavelength locking is provided to the first remotely generated signal and the second remotely generated signal by the remote node according to a second TDM window such that the first remotely generated signal and the second remotely generated signal never comprise the first dither signal at the same time, and
  wherein the second TDM window is localized to the remote node such that the remote node does not communicate the second TDM window to the apparatus or to any other network component that is not located within the remote node.

7. The apparatus of claim 6, wherein the first TDM window and the second TDM window are not synchronized with one another.

8. The apparatus of claim 1, wherein the at least one processor is further configured to forward the composite WDM signal to a second remote node that is located remotely from both the remote node and the apparatus.

9. An apparatus comprising:
  a first transponder configured to generate a first optical signal;
  a second transponder configured to generate a second optical signal;
  an optical fiber configured to propagate a third optical signal, wherein the third optical signal is not generated by the apparatus;
  an optical multiplexer configured to combine the first optical signal, the second optical signal, and the third optical signal into a composite wavelength division multiplexed (WDM) optical signal; and
  a wavelength locker configured to wavelength lock the first optical signal and the second optical signal, but not the third optical signal,
  wherein the first optical signal and the second optical signal are wavelength locked using a first dither frequency that is different than a second dither frequency used to lock the third optical signal, and
  wherein the first optical signal and the second optical signal share the first dither frequency using a time division multiplexing (TDM) wavelength locking scheme that is localized to the apparatus.

10. The apparatus of claim 9, wherein the apparatus comprises only one wavelength locker.

11. The apparatus of claim 9, wherein the wavelength locker is located on a fiber output of the optical multiplexer.

12. The apparatus of claim 9 further comprising an optical demultiplexer configured to:
  receive a WDM signal comprising the third optical signal and at least one other optical signal;
  demultiplex the WDM signal to separate the third optical signal from the at least one other optical signal; and
  forward the third optical signal on the optical fiber.

13. The apparatus of claim 12, wherein the optical demultiplexer is coupled to the optical fiber, and wherein optical fiber extends from the optical demultiplexer to the optical multiplexer.

14. The apparatus of claim 13 further comprising an optical amplifier coupled to the optical demultiplexer and configured to amplify the WDM signal before the WDM signal is received by the optical demultiplexer.

15. A method comprising:
  assigning, by a network manager, a first dither frequency to a first intermediate node in a network and a second dither frequency to a second intermediate node in the network, wherein the first dither frequency is different than the second dither frequency;
  providing, by the first intermediate node, wavelength locking to a first plurality of optical signals in a first wavelength division multiplexed (WDM) signal, wherein the first plurality of optical signals are generated by the first intermediate node and comprise the first dither frequency, but not the second dither frequency;
  providing, by the second intermediate node, wavelength locking to a second plurality of optical signals in a composite WDM signal that comprises both the second plurality of optical signals and at least some of the first plurality of optical signals,
    wherein the second plurality of optical signals are generated by the second intermediate node and comprise the second dither frequency, but not the first dither frequency, and
    wherein providing wavelength locking to the second plurality of optical signals comprises isolating the second plurality of optical signals from the first plurality of optical signals by electronically filtering, at the second intermediate node, a portion of the composite WDM signal according to the second dither frequency; and
  transmitting, by the second intermediate node, the composite WDM signal to a third intermediate node.

16. The method of claim 15, wherein the first intermediate node provides wavelength locking to the first plurality of optical signals according to a first time-division-multiplexed (TDM) wavelength locking scheme that is localized to the first intermediate node, and
  wherein the second intermediate node provides wavelength locking to the second plurality of optical signals according to a second TDM wavelength locking scheme that is localized to the second intermediate node.

17. The method of claim 16, wherein the first TDM wavelength locking scheme comprises sequentially introducing a first dither signal comprising the first dither frequency into each of the first plurality of optical signals according to a first TDM window,
  wherein the first TDM window comprises a first plurality of timeslots,
  wherein a unique one of the first plurality of timeslots is assigned to each of the first plurality of optical signals such that no two optical signals are assigned the same timeslot, and
  wherein none of the first plurality of timeslots is assigned to any of the second plurality of optical signals.

18. The method of claim 17, wherein the second TDM wavelength locking scheme comprises sequentially introducing a second dither signal comprising the second dither frequency into each of the second plurality of optical signals according to a second TDM window comprising a second plurality of timeslots, wherein a unique one of the second plurality of timeslots is assigned to each of the second plurality of optical signals, wherein none of the second plurality of timeslots is assigned to any of the first plurality of optical signals, wherein the first intermediate node does not have access to the second TDM window, and wherein the second intermediate node does not have access to the first TDM window.

19. The method of claim 15 further comprising: adding, by the network manager, a third intermediate node to the network subsequent to an initialization of, and communication between, the first intermediate node and the second intermediate node, wherein adding a third intermediate node comprises assigning a third dither frequency to the third intermediate node, wherein the third dither frequency is different than both the second dither frequency and the first dither frequency, wherein, after being added to the network, the third intermediate node provides wavelength locking to at least one output signal generated locally within the third intermediate node, and wherein the third intermediate node is added to the network without modifying any aspect or characteristic of the wavelength locking in the first intermediate node and the second intermediate node.

* * * * *